(12) United States Patent
Okada

(10) Patent No.: US 8,621,429 B2
(45) Date of Patent: Dec. 31, 2013

(54) SOFTWARE DEVELOPMENT SUPPORT APPARATUS, FUNCTION EXTENSION METHOD AND STORAGE MEDIUM FOR STORING FUNCTION EXTENSION PROGRAM

(75) Inventor: Yoshihiro Okada, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 12/724,562

(22) Filed: Mar. 16, 2010

(65) Prior Publication Data
US 2010/0262956 A1    Oct. 14, 2010

(30) Foreign Application Priority Data
Apr. 10, 2009    (JP) .................................. 2009-96290

(51) Int. Cl.
*G06F 9/44*    (2006.01)
(52) U.S. Cl.
USPC ............ 717/108; 717/113; 717/116; 717/118
(58) Field of Classification Search
None
See application file for complete search history.

(56) References Cited

U.S. PATENT DOCUMENTS
7,203,926 B2 *  4/2007  Bogle et al. ................... 717/124

FOREIGN PATENT DOCUMENTS
JP    9-222974 A    8/1997
JP    2008210059 A    9/2008

* cited by examiner

*Primary Examiner* — Chuck Kendall

(57) ABSTRACT

A software development support apparatus includes: a class memory unit which stores a class for generating a unit object which carries out predetermined processing; an object generating unit which reads the class and generates the unit object; an annotation analysis unit which determine whether the class includes annotation information; and an extended-function execution unit which carries out an extended-function object corresponding to the class. When the annotation analysis unit determines that the class includes the annotation information, the object generating unit generates the extended-function object based on the annotation information, and when the unit object to the class is called from a predetermined application and carried out, the extended-function execution unit carries out the extended-function object to the class.

14 Claims, 20 Drawing Sheets

Fig.6

```
23a
  101:
  @StandardMBean(description = "This is a sample MBean.")
  public class Sample { private int sampleValue = 0; //field
      :
      @Constructor(description = "This is a constructor of a sample MBean.")
      public Sample() { ... } //constructor
      :
      @Attribute(description = "This is a attribute of a sample MBean.")
      public int getSampleValue() { return sampleValue; } //method
      :
  }

102:
  @Monitor(type = CounterMonitor.class, granularityPeriod = "10000")
  public int getSampleValue() { return ...; }

103:
  @StandardMBean(description = "This is a sample MBean.")
  @Interceptors({SampleInterceptor.class})
  public class Sample {
      :
      @AroundInvoke
      public int getSampleValue() { return ...; }
      :
  }

104:
  @Validate(min = 10, max = 100)
  public void setSampleValue(int sampleValue) { ...; }
```

Fig.7

```
23a
  105:
  @DependenceAttribute(name = "Sample2")
  public Integer setSampleValue(int sampleValue) { ...; }
  ...
  ...
  ...
  public Integer setSampleValue2(int sampleValue2) { ...; }

106:
  @Attribute(description = "The sample value of this MBean.",
             displayName="Sample Value", persistPolicy="OnUpdate",
             default=50, visibility=1)
    public int getSampleValue() { // getter method (attribute: Samplevalue)
      ...
  }

107:
  @Operation(description = "Reset the sample value of this MBean.",
             displayName="Reset", visibility=1)
    public void reset() { //operation method; (operation: reset)
      ...
  }
```

Fig.8

```
@StandardMBean
public class Sample implements SampleMBean { // MBean class
    private int sampleValue = 0;

public Sample() {
    }

@Attribute(description = "The sample value of this MBean.")
    @Monitor(type = CounterMonitor.class, granularityPeriod = "10000",
        lowThreshold = 0, highThreshold = 100)
    public int getSampleValue() { // getter method (attribute: SampleValue)
        return sampleValue;
    } public void setSampleValue(int value) { // setter method (attribute: SampleValue)
        sampleValue = value;
    }

@Operation(description = "Reset the sample value of this MBean.")
    public void reset() { // operation method: (operation: reset)
        this.sampleValue = 0;
    }
    ...
}
```

Fig.9

```
import java.lang.management.*;
import javax.management.*;
import javax.management.monitor.*;

public class Sample implements SampleMBean { //MBean class
  private int sampleValue = 0;

public Sample() {
    //
    GaugeMonitor monitor = new GaugeMonitor(...);
    ObjectName objectName = null;
    ObjectName monitorObjectName = null;
    try {
      objectName = new ObjectName(...);
      monitorObjectName = new ObjectName(...);
    } catch (MalformedObjectNameException e) { ... }
    ...
    monitor.setObservedObject(objectName);
    monitor.setObservedAttribute("SampleValue");
    monitor.setGranularityPeriod(1000);
    monitor.setThresholds(100, 0);
    MBeanServer mbs = ManagementFactory.getPlatformMBeanServer();
    if (!mbs.isRegistered(monitorObjectName)) {
      try {
        mbs.registerMBean(monitor, monitorObjectName);
      } catch (InstanceAlreadyExistsException e) { ... }
      } catch (MBeanRegistrationException e) { ... }
      } catch (NotCompliantMBeanException e) { ... }
      ...
    }
  }
}
```

```
public int getSampleValue() { //getter method (attribute: SampleValue)
  return sampleValue;
} public void setSampleValue(int value) { //setter method (attribute: SampleValue)
  sampleValue = value;
} public void reset() { //operation method (operation: reset)
  this.sampleValue = 0;
}
...

public interface SampleMBean { //MBean interface
  public int getSampleValue();
  public void setSampleValue(int value);
  public void reset();
}
```

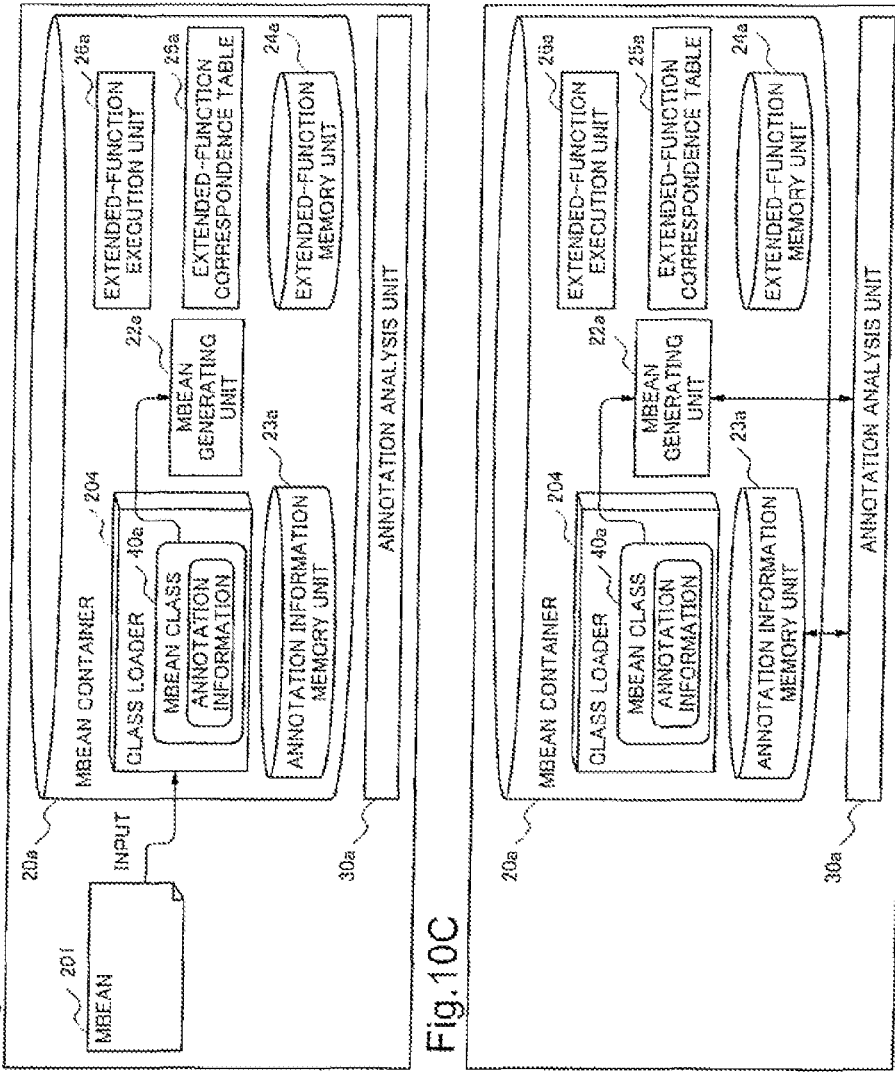

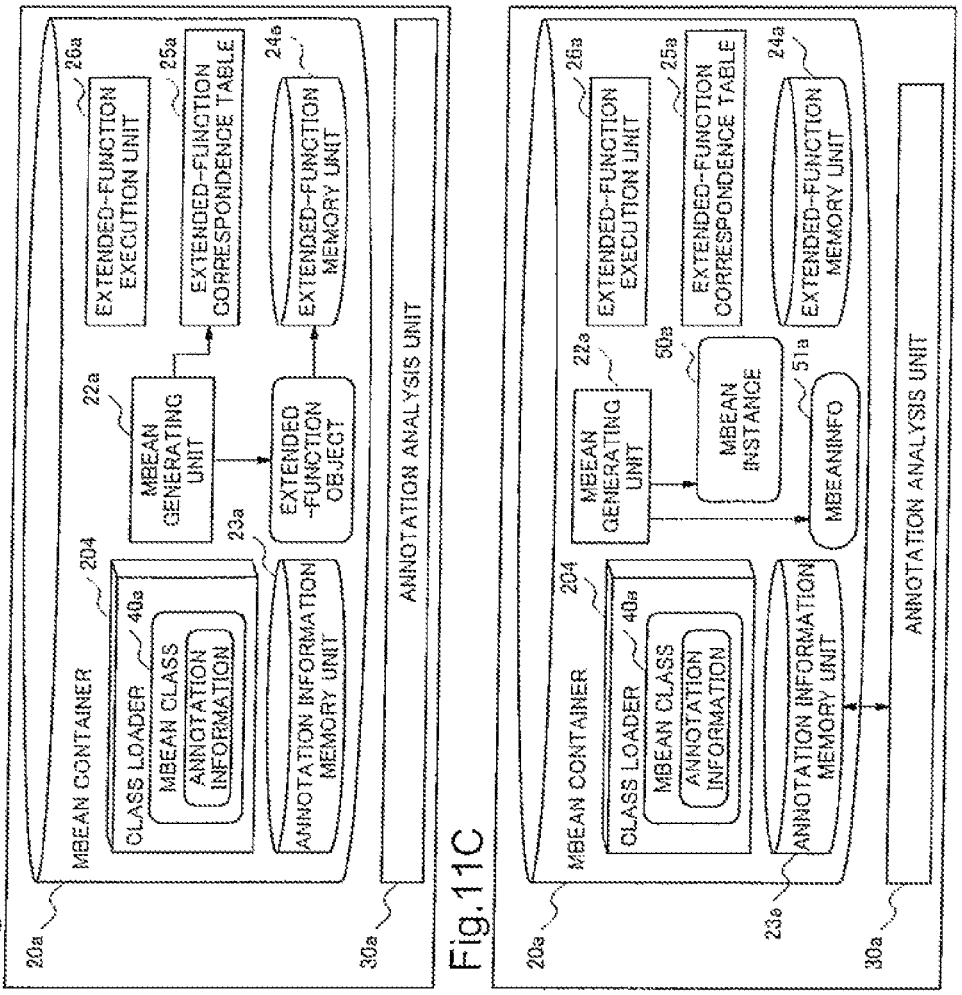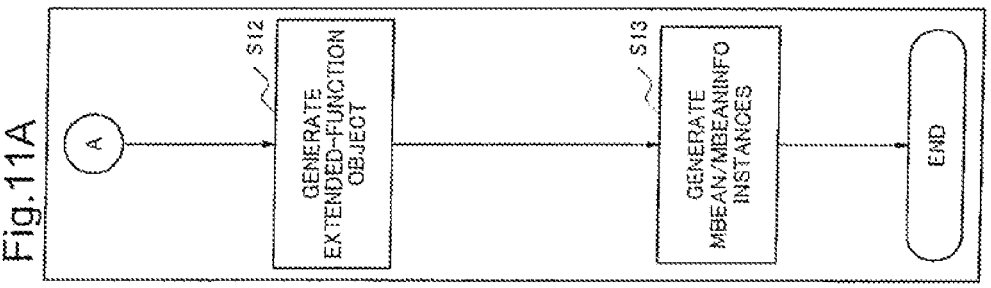

SOFTWARE DEVELOPMENT SUPPORT APPARATUS, FUNCTION EXTENSION METHOD AND STORAGE MEDIUM FOR STORING FUNCTION EXTENSION PROGRAM

This application is based upon and claims the benefit of priority from Japanese Patent Application No. 2009-096290, filed on Apr. 10, 2009, the disclosure of which is incorporated herein in its entirety by reference.

TECHNICAL FIELD

The present invention relates to a software development support apparatus, a function extension method and a storage medium for storing a function extension program.

BACKGROUND ART

Nowadays, the idea of EoD (Ease of Development) is spreading in Java (the registered trademark of Sun Microsystems incorporated: hereinafter, the same meaning shall apply). EoD is a specification policy of Java that everyone can perform Java development easily. In particular, specifications about implementation of an application in which a business logic such as EJB (Enterprise Java Beans) and Servlet is included have begun to be provided. By utilizing annotation information, these specifications make developer's work simplified and light-weighted as far as possible.

Here, as a technology related to a scheme to utilize annotation information, there are a method disclosed in Japanese Patent Application Laid-Open No. 2008-210059 (patent document 1) and a method disclosed in Japanese Patent Application Laid-Open No. 1997-222974 (patent document 2), for example.

According to the method disclosed in patent document 1, an analyzer has a structure which extracts annotation information embedded in a method definition section in a source code, and converts the annotation information into a form that can be evaluated on a debugger. By a developer defining a specific conditional expression as annotation information, the analyzer can make debugging work when abnormality happening in a program efficient.

Also, according to a method disclosed in patent document 2, an analyzer has a structure which extracts annotation information embedded in HTML (Hyper Text Makeup Language), and a display apparatus has a structure which customizes information to be displayed on a screen based on the information. This annotation information is described as a comment in HTML. The display apparatus can analyze this annotation information. By this structure, the display apparatus keeps backward compatibility about display of HTML data in which annotation information is embedded. The display apparatus can customize display based on the annotation information.

SUMMARY

An exemplary object of the invention is to provide a software development support apparatus, a function extension method and a storage medium for storing a function extension program which can make coding related to JMX (Java Management Extensions) or the like be simplified, and can make processing which is customized more highly and more in detail than the JMX specification be carried out.

A software development support apparatus according to an exemplary aspect of the invention includes: a class memory unit which stores a class for generating at least one unit object which carries out predetermined processing; an object generating unit which reads the class and generates the unit object; an annotation analysis unit which determines whether or not the class includes annotation information which indicates an attribute of the class or operation to the class; and an extended-function execution unit which carries out an extended-function object corresponding to the class, wherein when the annotation analysis unit determines that the class includes the annotation information, the object generating unit generates the extended-function object which adds to the class an attribute of the class or operation to the class indicated by the annotation information on an occasion of generating the unit object, and wherein when the unit object corresponding to the class is called from a predetermined application and carried out, the extended-function execution unit carries out the extended-function object corresponding to the class.

A function extension method according to an exemplary aspect of the invention includes: storing a class for generating at least one unit object which carries out predetermined processing; reading the class and generating the unit object; determining whether or not the class includes annotation information which indicates an attribute of the class or operation to the class; generating an extended-function object which adds to the class an attribute of the class or operation to the class indicated by the annotation information on an occasion of generating the unit object when it is determined that the class includes the annotation information; and carrying out the extended-function object corresponding to the class when the unit object corresponding to the class is called from a predetermined application and carried out.

A storage medium storing thereon a program product according to an exemplary aspect of the invention causing a computer to execute steps of: storing a class for generating at least one unit object which carries out predetermined processing; reading the class and generating the unit object; determining whether or not the class includes annotation information which indicates an attribute of the class or operation to the class; generating an extended-function object which adds to the class an attribute of the class or operation to the class indicated by the annotation information on an occasion of generating the unit object when it is determined that the class includes the annotation information; and carrying out the extended-function object corresponding to the class when the unit object corresponding to the class is called from a predetermined application and carried out.

BRIEF DESCRIPTION OF THE DRAWINGS

Exemplary features and advantages of the present invention will become apparent from the following detailed description when taken with the accompanying drawings in which:

FIG. 6 is a diagram showing Example 1 of an annotation file which is included in an annotation information memory unit 23a in a software development support system of the first exemplary embodiment of the present invention;

FIG. 7 is a diagram showing Example 2 of an annotation file which is included in an annotation information memory unit 23a in a software development support system of the first exemplary embodiment of the present invention;

FIG. 8 is a diagram showing a code example of an MBean class in a software development support system of the first exemplary embodiment of the present invention;

FIG. 9 is a diagram showing a code example of an MBean class in related technology;

FIG. 10A is a flow chart showing the summary of the processing procedure (the first half) of generation of MBean in a software development support system of the first exemplary embodiment of the present invention;

FIG. 10B is a diagram illustrating Step S10 of the summary of the processing of MBean generation in a software development support system of the first exemplary embodiment of the present invention;

FIG. 10C is a diagram illustrating Step S11 of the summary of the processing of MBean generation in a software development support system of the first exemplary embodiment of the present invention;

FIG. 11A is a flow chart showing the summary of the processing procedure (the second half) of generation of MBean in a software development support system of the first exemplary embodiment of the present invention;

FIG. 11B is a diagram showing Step S12 of the summary of the processing of MBean generation in a software development support system of the first exemplary embodiment of the present invention;

FIG. 11C is a diagram showing Step S13 of the summary of the processing of MBean generation in a software development support system of the first exemplary embodiment of the present invention;

EXEMPLARY EMBODIMENT

Next, a software development support apparatus, a software development support system, a function extension method and a storage medium for storing a function extension program in each exemplary embodiment of the present invention will be described with reference to the drawings.

Meanwhile, a software development support apparatus indicated in the following each exemplary embodiment operates on a computer controlled by a program. CPU of the computer sends an order to each component of the computer based on a program. Then, the computer makes each component perform predetermined processing needed for operation of the software development support apparatus. Such predetermined processing includes such as processing of generating a unit object, processing of analyzing annotation information included in a class, processing of generating an extended-function object based on an analysis result of annotation information and processing of carrying out an extended-function object, for example. Thus, individual processing and operation in a software development support apparatus of each exemplary embodiment of the present invention can be realized by a specific means in which a program and a computer cooperate.

A program is stored in the storage medium such as ROM (Read Only Memory) and RAM (Random Access Memory) in advance. This program is read from the storage medium mounted on a computer to be carried out. And, for example, this program may be read by a computer via a communication line.

The storage medium for storing a program may be constituted by a semiconductor memory, a magnetic disk, an optical disk or any recording means which is computer-readable, for example.

The First Exemplary Embodiment

The first exemplary embodiment of the present invention relates to a software development support apparatus, a software development support system, a function extension method and a storage medium for storing a function extension program which performs function extension of JMX. JMX is a standard specification for monitoring and managing an application and a system device using Java.

Figure 1:
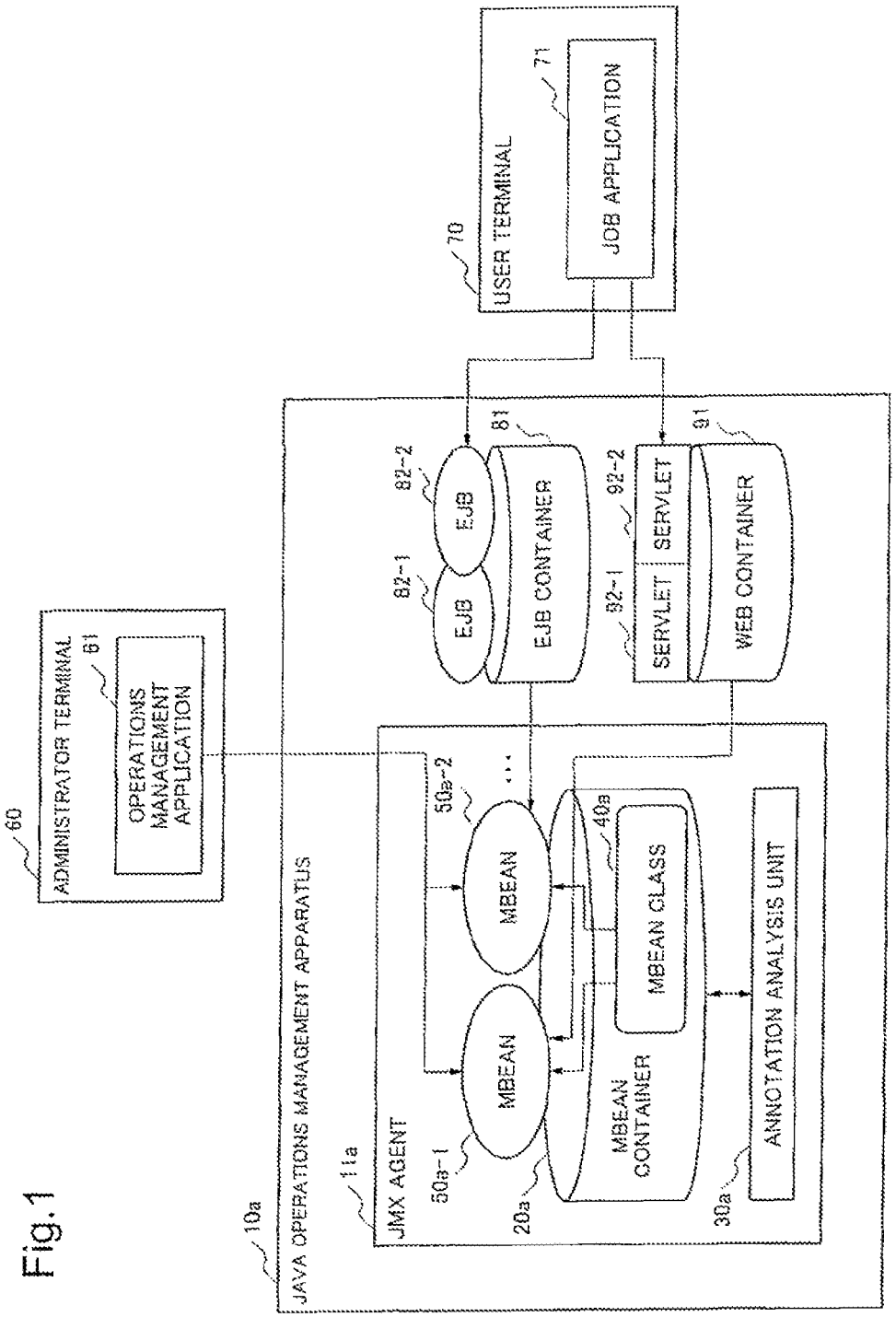
FIG. 1 is a block diagram showing a structure of software development support system of a first exemplary embodiment of the present invention.
Figure 2:
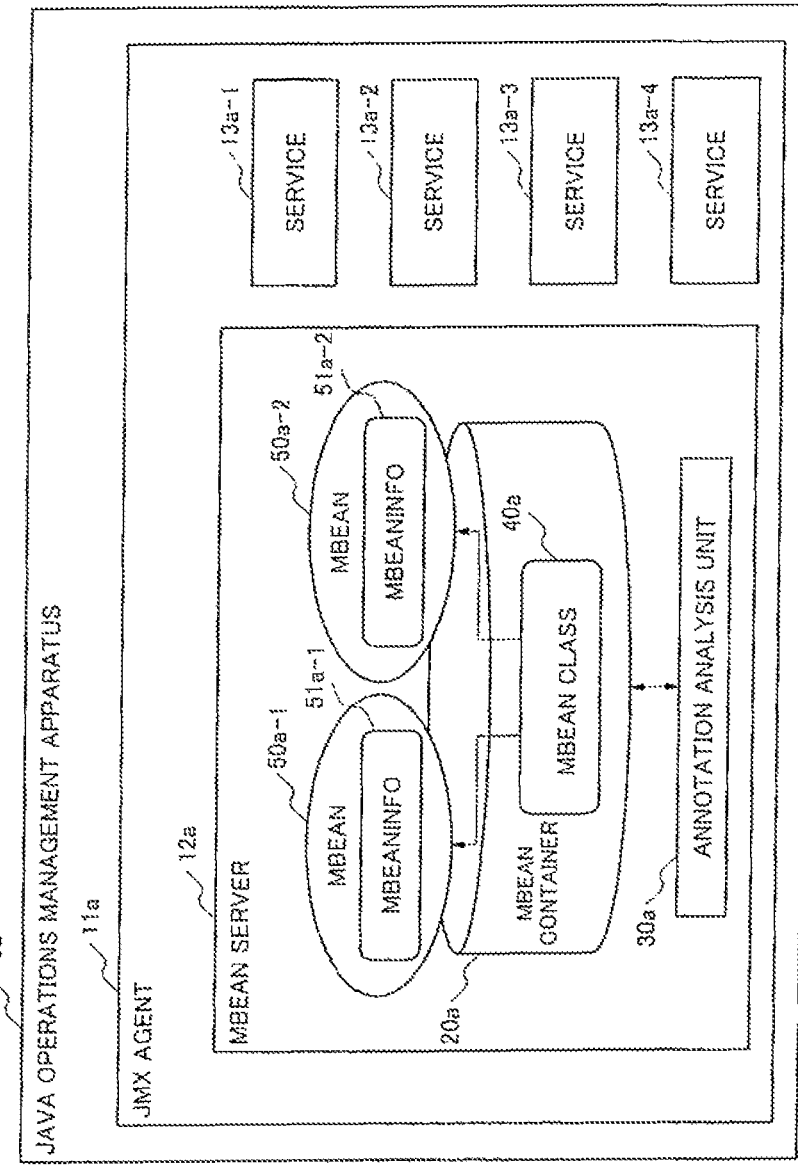
FIG. 2 is a block diagram showing a structure of a software development support apparatus in a software development support system of the first exemplary embodiment of the present invention.
Figure 3:
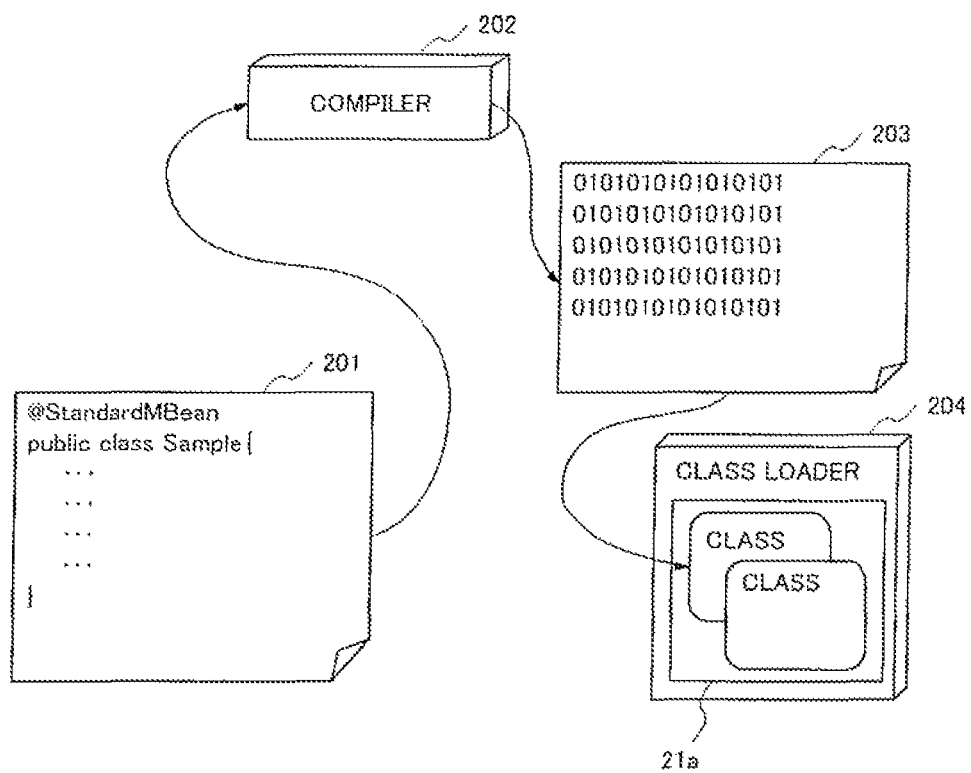
FIG. 3 is a diagram illustrating a class in a software development support system of the first exemplary embodiment of the present invention.
Figure 4:
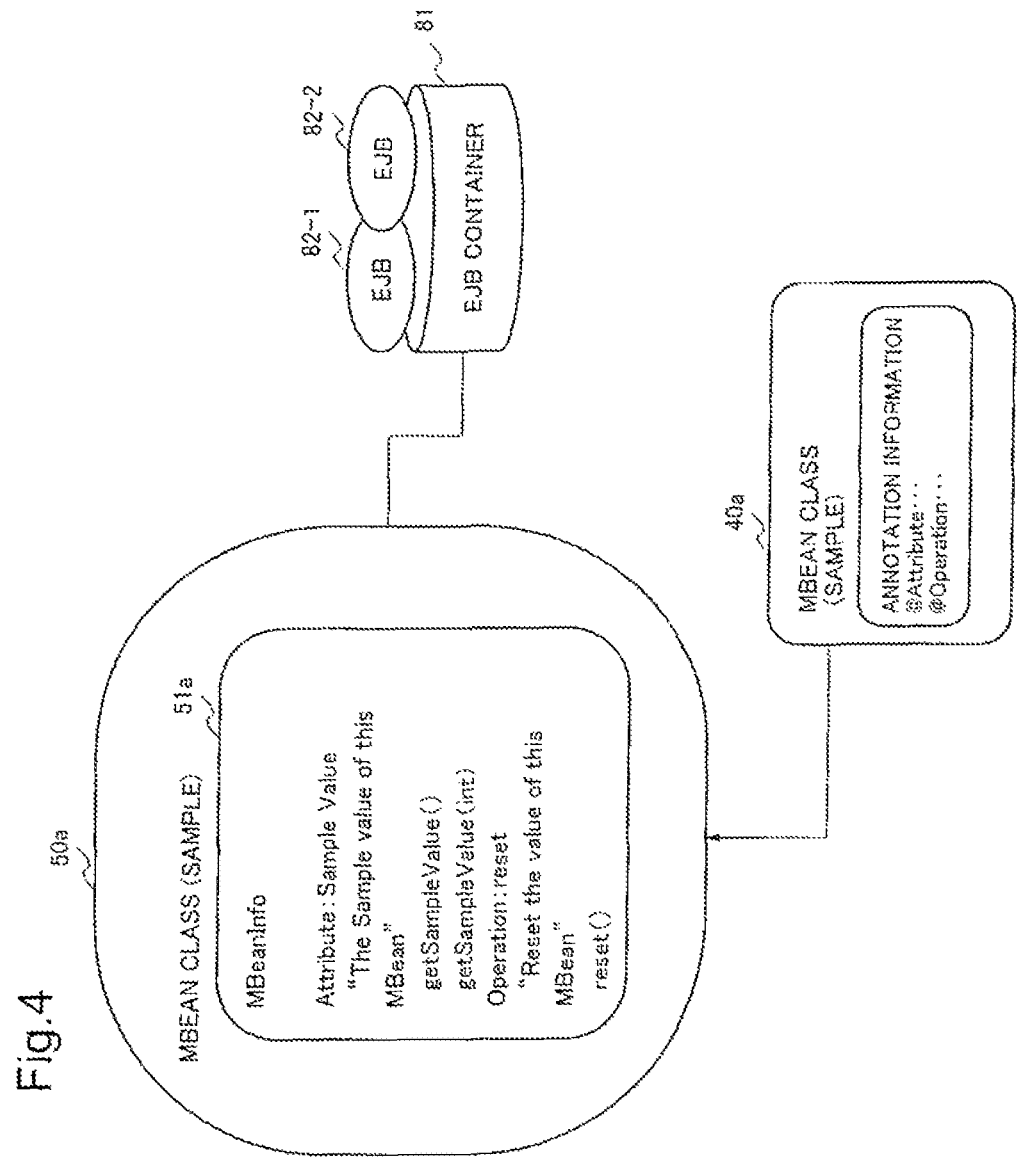
FIG. 4 is a diagram showing instantiation of MBean (Managed Bean) in a software development support system of the first exemplary embodiment of the present invention.
Figure 5:
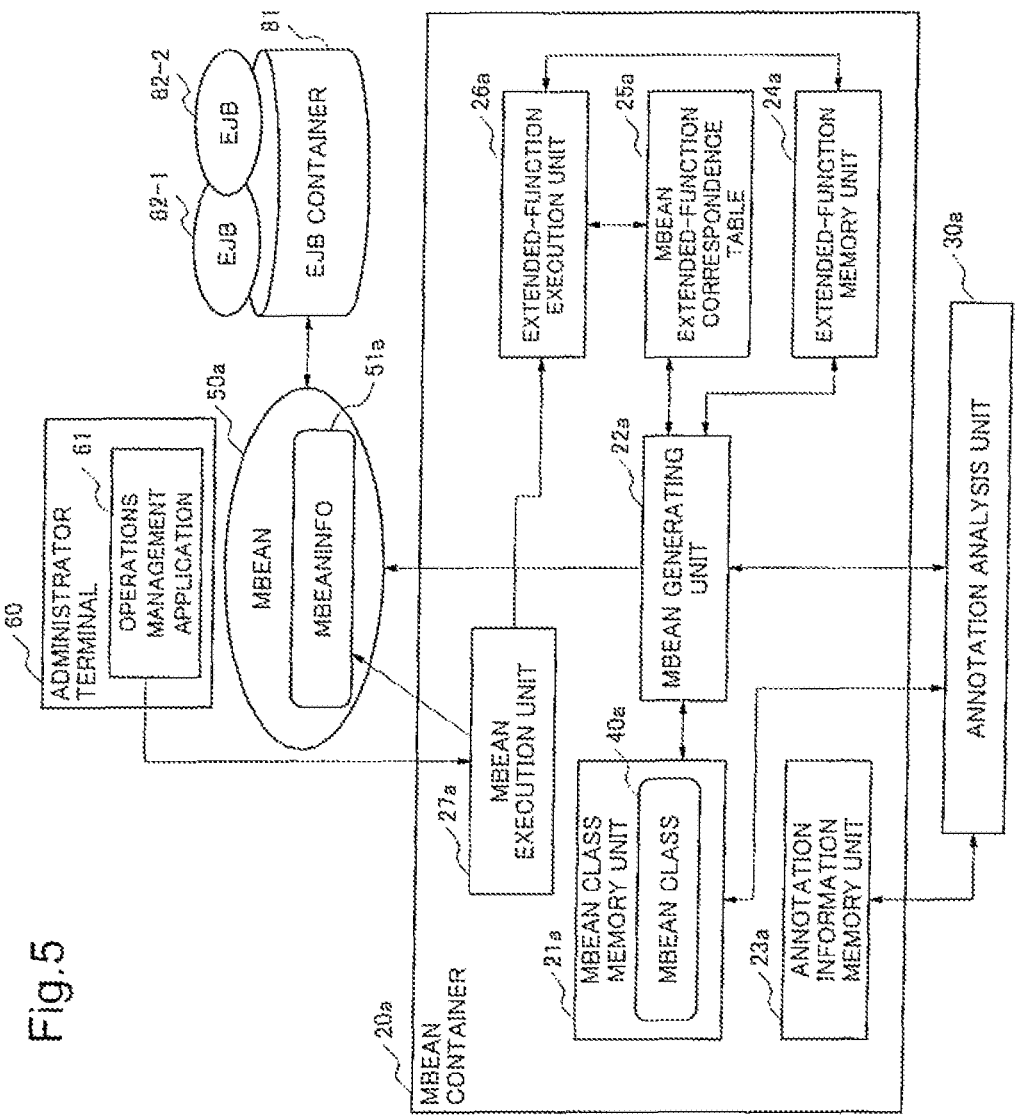
FIG. 5 is a block diagram showing a structure of an MBean container in a software development support system of the first exemplary embodiment of the present invention.

First, the configuration of this exemplary embodiment will be described with reference to FIGS. 1-9. FIG. 1 is a block diagram showing a structure of a software development support system (Java operations management system) of this exemplary embodiment. FIG. 2 is a block diagram showing a structure of a software development support apparatus (Java operations management apparatus) 10a of this exemplary embodiment. FIG. 3 is a diagram illustrating a class in Java. FIG. 4 is a diagram showing an instantiation of MBean 50a in this exemplary embodiment. FIG. 5 is a block diagram showing a structure of an MBean container 20a of this exemplary embodiment. FIG. 6 and FIG. 7 are diagrams showing an example of an annotation file in this exemplary embodiment. FIG. 8 is a diagram showing a code example in MBean class 40a in this exemplary embodiment. FIG. 9 is a diagram showing a code example in MBean class 40a in related technology.

A software development support system of this exemplary embodiment is used as a Java operations management system, for example. As shown in FIG. 1, a software development support system of this exemplary embodiment includes a software development support apparatus (Java operations management apparatus) 10a and an administrator terminal 60. A job application 71 in a user terminal 70 includes a structure which can access EJB (Enterprise Java Beans) 82 and Servlet 92 in the software development support apparatus 10a.

The MBean 50a (50a-1, 50a-2, ... ) in the software development support apparatus 10a is called from an operations management application 61 in the administrator terminal 60. Then, the MBean 50a inputs information from an EJB container 81 and a web container 91. Accordingly, a software development support system includes a structure which manages EJB 82 (82-1, 82-2, ... ) and Servlet 92 (92-1, 92-2, ... ).

According to this exemplary embodiment, when the software development support apparatus 10a generates such MBean 50a, an annotation analysis unit 30a analyzes annotation information in the MBean class 40a, and an MBean container 20a generates an extended-function of the MBean 50a automatically. By this, when the MBean 50a is called, the MBean container 20a can carry out the extended-function of the MBean 50a.

Annotation information is information which indicates the content of a predetermined extended-function. FIG. 6 and FIG. 7 are diagrams showing an example of an annotation file which is included in the annotation information memory unit 23a in this exemplary embodiment. An annotation file is a file including annotation information. Referring to FIG. 6, the annotation information memory unit 23a includes annotation files 101, 102, 103 and 104. The annotation file 101 is an annotation file which indicates configuration information on the MBean 50a. An annotation file 102 is an annotation file for monitoring an attribute value which the MBean 50a has. An annotation file 103 an annotation file for carrying out optional processing by interrupting before and after a Java method is called. An annotation file 104 is an annotation file which indicates an effective area of a parameter which has been handed to an argument of a Java method. Referring to FIG. 7, the annotation information memory unit 23a includes annotation files 105, 106 and 107. The annotation file 105 is an annotation file for synchronization of change information. An annotation file 106 is an annotation file including a parameter about an attribute stored in a descriptor area. An annotation file 107 is an annotation file including a parameter about operation stored in a descriptor area.

For example, in FIG. 6 and FIG. 7, a character string which continues following "@" and a character string enclosed in parentheses are annotation information (the underlined portions of FIG. 6 and FIG. 7). In this specification, method information which is information about each Java method included in the MBean class 40a is referred to as management information. Among the management information, information which can be updated by a getter method or a setter method that are a public method is referred to as attribute information. Among the management information, information about public methods besides a getter method and a setter method are referred to as operational information. In this specification, public methods besides a getter method and a setter method are referred to as an "operation method".

This annotation information may include such as information which indicates a structure of the MBean 50a and information which indicates an attribute and operation of the MBean 50a. In the examples of FIG. 6 and FIG. 7, "@StandardMBean", "@Constructor" is information which indicates a structure of the MBean 50a. Also, "@Attribute", "Monitor", "@DependenceAttribute" is information which indicates an attribute of the MBean 50a. "@Operation" is information which indicates operation of the MBean 50a. "@Interceptors", "@AroundInvoke", "@Validate" is information which indicates an attribute and operation of the MBean 50a.

As shown in FIG. 2, the MBean container 20a generates MBeanInfo 51a (51a-1, 51a-2, ... ) corresponding to the MBean 50a automatically using annotation information on an occasion of generation of the MBean 50a. Because the operations management application 61 in the administrator terminal 60 can refer to that annotation information, the operations management application 61 can manage the MBean 50a easily.

The software development support apparatus (Java operations management apparatus) 10a of this exemplary embodiment may be constructed by an information processing apparatus in the server side for managing an application server and a server application which monitors such as a process or a computer. For example, the software development support apparatus 10a of this exemplary embodiment may be constructed by a Web server, an application server or the like of a Java base. Such a web server, an application server or the like of a Java base plays the role as a Java virtual machine.

This software development support apparatus 10a includes a JMX agent 11a.

The JMX agent 11a includes a comprehensive service which manages the MBean 50a. The JMX agent 11a is a managed entity (Managed Entity) carried out in the software development support apparatus 10a. Connection of the JMX agent 11a is made between the MBean 50a and the job application 71 or the EJB 82 (82-1, 82-2, ... ), the Servlet 92 (92-1, 92-2, ... ) or the like which is called by the job application 71 so that it is possible to communicate with each other.

As shown in FIG. 2, the JMX agent 11a includes an MBean server 12a and one or more service 13a (in the example of FIGS. 2, 13a-1, ... and 13a-4).

The MBean server 12a manages the MBean 50a. The MBean server 12a is a core component of the JMX agent 11a. The MBean server 12a includes a structure which functions as a repository of the MBean 50a for the operations management application 61 in the administrator terminal 60 to access the MBean 50a.

The service 13a is a means to carry out predetermined general-purpose processing. According to the JMX specification, the JMX agent 11a needs to include the predetermined number of the service 13a.

In this exemplary embodiment, this service 13a carries out processing for storing other specific MBeans and the like generated on an occasion of generation of the MBean 50a to a predetermined memory unit in the MBean server 12a, for example.

The MBean 50a is an MBean instance which the MBean container 20a generates based on the MBean class 40a and which conforms to JMX API (Application Program Interface). The MBean 50a is a unit object which is a management objective. In the example of FIG. 1, the MBean 50a inputs information from the EJB container 81 and the web container 91. Inputted information may be log information on various processing carried out based on a request from the job application 71, or may be such as the number of current objects of the EJB 82 (82-1, 82-2, ... ), the Servlet 92 (92-1, 92-2, ... ) or the like, and the number of calls of such objects, for example.

In the JMX specification, once the MBean 50a is stored in a predetermined MBean memory unit of the software development support apparatus 10a, the MBean container 20a may carry out the MBean 50a based on a request from a JMX client. Meanwhile, this MBean memory unit is not illustrated, and the MBean 50a is included in the MBean container 20a in this exemplary embodiment. However, an MBean memory unit which stores the MBean 50a may be provided outside the MBean container 20a, or it may be arranged inside the MBean container 20a.

The MBean class 40a is for generating the MBean 50a. The MBean container 20a reads the MBean class 40a, and generates one or more MBean 50a corresponding to the MBean class 40a.

The MBean container 20a generates a "class file". A "class file" includes a code which indicates the MBean class 40a. A "class file" in Java generally means either one of the following two, as shown in FIG. 3.

(1) A "class file" is a file 201 of a text format in which class definition is described according to the specification of the Java language in a form readable by human beings. Alternatively, a "class file" is a file of a text format in which class definition is coded according to the specification of the Java language in a form readable by human beings. In this case, the file name of this file will be *.java.

(2) A "class file" is a data file which is made by converting (translating) the above-mentioned file 201 into a binary form that can be carried out on a Java virtual machine through applying a tool named a compiler 202 to the file 201. Such a file 203 is taken into a Java process by a class loader 204 of Java. In this case, the file name of the file 203 will be *.class.

The class loader 204 has a function to take data (class data) included in any class file of Java into a Java process, a function for generating an instance and a function for initializing based on the data taken in. Also, the class loader 204 has a function for storing and managing all class data taken in. In this exemplary embodiment, a memory unit in this class loader 204 is an MBean class memory unit 21a.

Conversion work to a form that can be carried out by a "compiler" is generally called "compilation". In Java, there are following two kinds of compilation methods mainly.

(1) A developer converts a class file using a compiler tool in advance.

(2) By a server (Java virtual machine) reading a text file (class file) which is not yet converted and performing a compilation processing dynamically, the text file which has been read is converted to a file of an executable form.

Note that, although a "class file" is of a form executable on a Java virtual machine, annotation information and the like can be incorporated in data (class data) of the class file. The annotation analysis unit 30a in this exemplary embodiment may be arranged such that it can analyze such incorporated annotation information. In this exemplary embodiment, it is assumed that a method of compilation indicated by (1) is used. However, a method of "compilation" is not limited to this.

FIG. 4 indicates an example in which the MBean container 20a reads an MBean class 40a (class file) and then instantiates it, and finally generates the MBean 50a and the MBeanInfo 51a. As shown in FIG. 4, the MBean class 40a includes annotation information. When the MBean container 20a generates the MBean 50a, the annotation analysis unit 30a analyzes annotation information in the MBean class 40a. The MBean container 20a generates the MBeanInfo 51a including this annotation information.

The MBeanInfo 51a is an object which is generated along with the MBean 50a on an occasion of generation of the MBean 50a, with being correlated to each MBean 50a. The MBeanInfo 51a includes information about a structure, an attribute and operation of the MBean 50a that is a management objective. The operations management application 61 in the administrator terminal 60 can access this MBeanInfo 51a and refer to the content of the MBeanInfo 51a.

As a result, the operations management application 61 can manage the MBean 50a. The operations management application 61 can also manage the EJB 82 (82-1, 82-2, . . . ) and the Servlet 92 (92-1, 92-2, . . . ) which are management objectives of the MBean 50a.

The MBean container 20a is an object management means which generates and stores various objects, and operates various objects or attribute data and the like of the various objects.

The MBean container 20a generates the MBean 50a and the MBeanInfo 51a based on the MBean class 40a, as well as an extended-function object corresponding to the MBean 50a. The MBean container 20a carries out a generated extended-function object.

As shown in FIG. 5, the MBean container 20a includes the MBean class memory unit 21a, an MBean generating unit 22a, the annotation information memory unit 23a, an extended-function memory unit 24a, an MBean extended-function correspondence table 25a and an extended-function execution unit 26a.

The MBean class memory unit 21a stores the MBean class 40a. As this MBean class memory unit 21a, the class loader 204 may be used, as mentioned above.

The MBean generating unit 22a reads the MBean class 40a from the MBean class memory unit 21a. Then, the MBean generating unit 22a generates the MBean 50a corresponding to the MBean class 40a which has been read.

The annotation analysis unit 30a analyzes annotation information included in the MBean class 40a, and the MBean generating unit 22a generates the MBeanInfo 51a which includes this annotation information.

At that time, the annotation analysis unit 30a refers to the annotation information memory unit 23a in the MBean container 20a. The annotation analysis unit 30a determines whether annotation information being stored in this annotation information memory unit 23a exists in the MBean class 40a.

The annotation information memory unit 23a is a means to store annotation information, and it stores an annotation file which includes annotation information as shown in FIG. 6 and FIG. 7, for example.

When annotation information is included in the MBean class 40a, the annotation analysis unit 30a outputs the annotation information to the MBean generating unit 22a.

When the MBean generating unit 22a receives annotation information from the annotation analysis unit 30a, the MBean generating unit 22a determines whether this annotation information includes information about a predetermined extended-function. A developer may set information about a predetermined extended-function in advance. For example, in the example of FIG. 6, it is supposed that "@Monitor" and "@Interceptors" correspond to information about a predetermined extended-function.

When the annotation information includes information about a predetermined extended-function, the MBean generating unit 22a generates one or more extended-function objects based on the annotation information. The MBean generating unit 22a stores the generated extended-function objects to the extended-function memory unit 24a, and stores correlating information between the MBean 50a and the extended-function objects to the MBean extended-function correspondence table 25a.

The extended-function memory unit 24a stores the extended-function objects generated by the MBean generating unit 22a.

The MBean extended-function correspondence table 25a stores identification information of the MBean 50a and identification information of the extended-function objects corresponding to this MBean 50a in a form that they are correlated.

The extended-function execution unit 26a watches whether the MBean 50a is called from the operations management application 61.

When the MBean 50a is called from the operations management application 61, by referring to the MBean extended-function correspondence table 25a, the extended-function execution unit 26a identifies extended-function objects corresponding to the MBean 50a. The extended-function execution unit 26a acquires the identified extended-function objects from the extended-function memory unit 24a, and carries out the acquired extended-function objects.

The extended-function objects which the extended-function execution unit 26a acquires may be carried out as soon as the MBean 50a is called, or may be carried out at predetermined timing after the MBean 50a is called.

As mentioned above, in this exemplary embodiment, the extended-function execution unit 26a identifies extended-function objects corresponding to the MBean 50a called from the operations management application 61 by referring to the MBean extended-function correspondence table 25a. However, the extended-function execution unit 26a is not limited to the aforementioned structure. For example, when the extended-function memory unit 24a stores an extended-function object with identification information of the MBean 50a corresponding to the extended-function object, the MBean container 20a does not have to include the MBean extended-function correspondence table 25a.

When the MBean container 20a generates the MBean 50a based on a request from the MBean generating unit 22a, the annotation analysis unit 30a analyzes annotation information included in the MBean class 40a. The annotation analysis unit 30a returns an analysis result of this annotation information to the MBean generating unit 22a. When the MBean class 40a includes annotation information, this analysis result includes the annotation information.

Then, the MBean generating unit 22a generates the MBean 50a along with the MBeanInfo 51a including the annotation information. The MBean generating unit 22a generates an extended-function object which carries out an extended-function corresponding to the annotation information. The MBean generating unit 22a stores the extended-function object to the extended-function memory unit 24a.

FIG. 8 indicates an example of a code of the MBean class 40a including annotation information.

In FIG. 8, a character string which continues following "@" like "@Attribute" is an annotation definition in annotation information. A character string enclosed in parentheses like "(description='The sample value of this MBean.')" which is coded continuously after an annotation definition is the body of annotation information.

In this exemplary embodiment, annotation definition and a body of annotation information are collectively called annotation information.

In related technology, as shown in an underline part of FIG. 9, a developer needs to code about an extended-function object itself in order for an MBean generating unit to generate an extended-function object.

In contrast, according to this exemplary embodiment, a developer codes such that the MBean class 40a includes annotation information corresponding to that MBean class 40a. Then, the MBean generating unit 22a generates the MBean 50a by using the MBean class 40a including such annotation information.

As a result, the MBean container 20a can generate an extended-function object in addition to the MBean 50a on an occasion of generating the MBean 50a. In the example of FIG. 8, the extended-function object is monitor-dedicated MBean (JMX monitor MBean) generated based on annotation information "@Monitor(type=CounterMonitor.class, granularityPeriod='10000')". Generation of this monitor-dedicated MBean will be described later.

The MBean container 20a generates the MBeanInfo 51a which includes annotation information, along with the MBean 50a. In the example of FIG. 8, annotation information about @StandardMBean, @Attribute, @Monitor and @Operation is included in the MBean class 40a. Such annotation information is analyzed by annotation analysis unit 30a in turn.

The class file of the MBean class 40a in the example of FIG. 8 includes the above-mentioned annotation information and pieces of information which indicate three methods of getSampleValue, setSampleValue and reset, respectively. In order for the operations management application 61 to be able to refer to annotation information corresponding to the MBean 50a, the MBean container 20a generates the MBeanInfo 51a.

Thus, the software development support apparatus 10a according to this exemplary embodiment can generate MBean or the like which is customized more highly and more in detail than the JMX specification with a less code amount.

Next, a processing procedure in the software development support apparatus 10a of this exemplary embodiment will be described with reference to FIG. 10A and FIG. 11A. FIG. 10A and FIG. 11A are flow charts showing a processing procedure of MBean generation in the software development support apparatus 10a of this exemplary embodiment.

First, a generation processing procedure of the MBean 50a will be described.

The MBean class memory unit 21a in the MBean container 20a stores the MBean class 40a corresponding to the MBean 50a which is a generation target in advance.

Specifically, as shown in FIG. 10B, the file 201 of the MBean class 40a is inputted to the class loader 204 including the MBean class memory unit 21a, and the class loader 204 may memorize the inputted binary file.

Next, the MBean generating unit 22a reads the MBean class 40a from the MBean class memory unit 21a (Step S10).

Then, as shown in FIG. 10C, the annotation analysis unit 30a analyzes annotation information included in this MBean class 40a (Step S11).

Next, when annotation information includes information about a predetermined extended-function, the MBean generating unit 22a carries out the following processing as shown in FIG. 11B. That is, the MBean generating unit 22a generates an extended-function object corresponding to the MBean class 40a and the annotation information based on the annotation information and stores the extended-function object to the extended-function memory unit 24a. Specifically, the MBean generating unit 22a adds a new Java instance. The MBean generating unit 22a stores information which indicates correlation of the MBean 50a and the generated extended-function object to the MBean extended-function correspondence table 25a (Step S12).

The processing of Step S12 is performed for all pieces of annotation information included in the MBean class 40a.

Further, as shown in FIG. 11C, the MBean generating unit 22a generates the MBean 50a and also generates the MBeanInfo 51a corresponding to the MBean 50a.

At that time, the MBean generating unit 22a completes this MBeanInfo 51a by making annotation information which is included in the MBean class 40a included in the MBeanInfo 51a (Step S13).

Note that, the order of generation of an extended-function object in Step S12 and generation of the MBean 50a and the MBeanInfo 51a in Step S13 may be exchanged.

Figure 12:
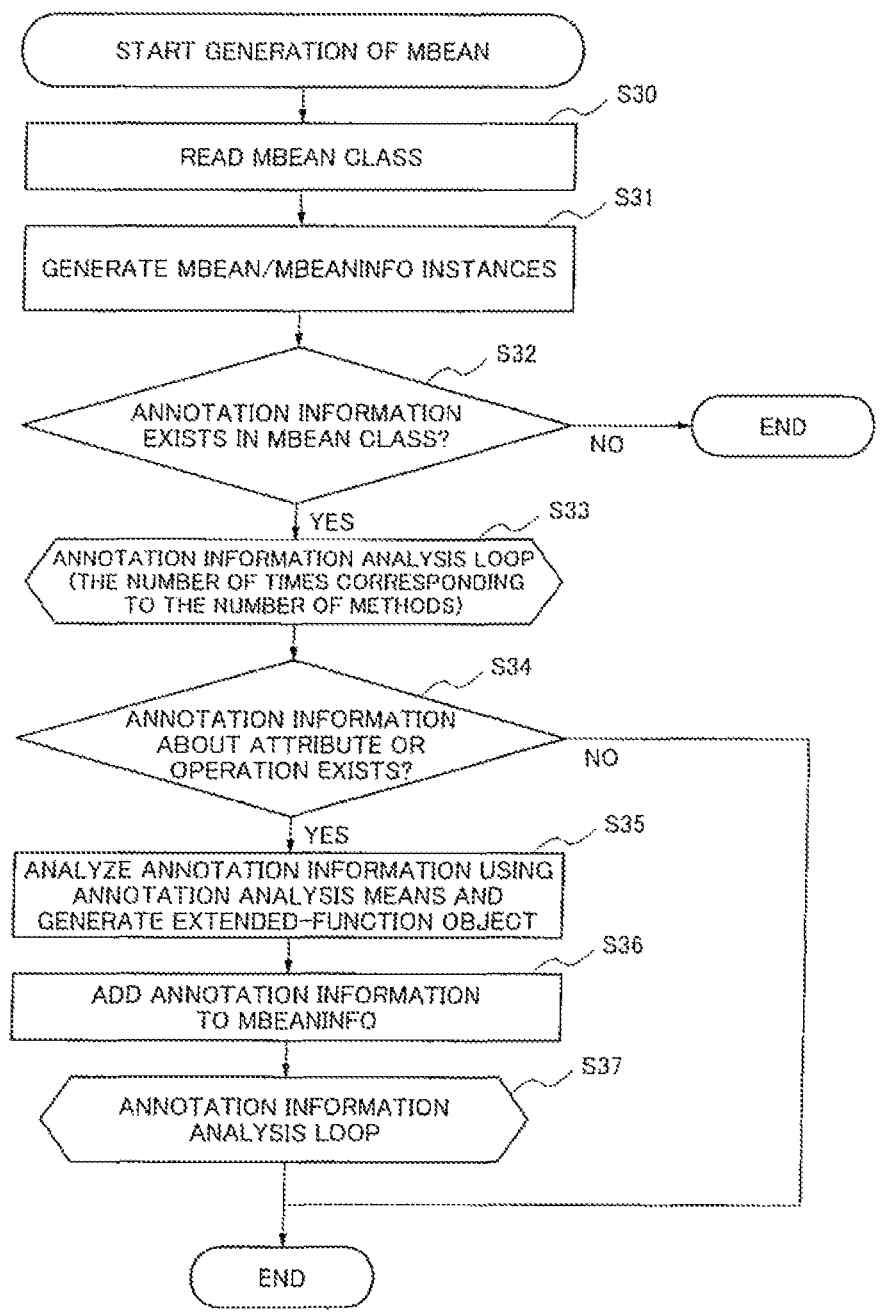
FIG. 12 is a flow chart showing a processing procedure of MBean generation in a software development support system of the first exemplary embodiment of the present invention.
Figure 13:
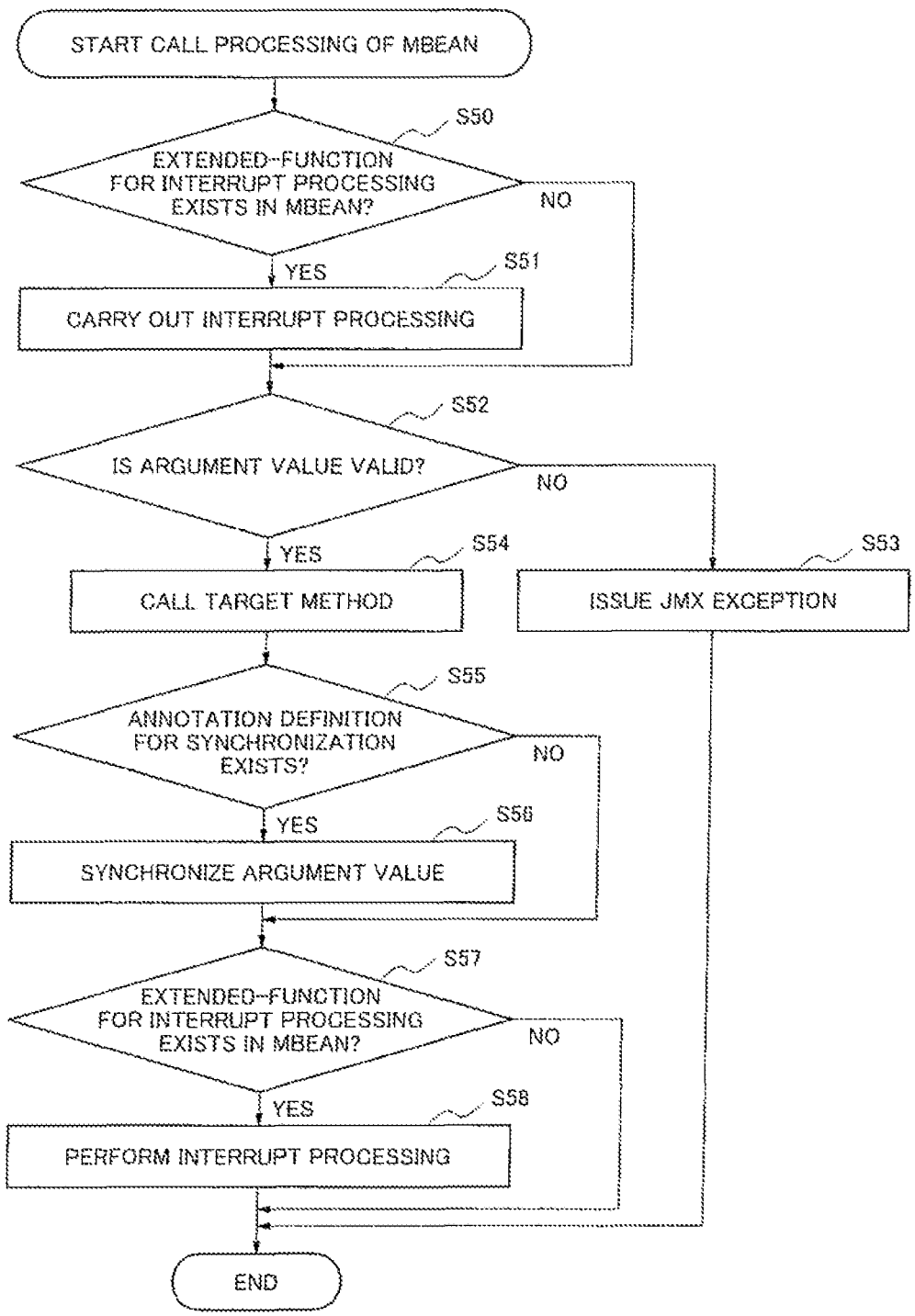
FIG. 13 is a flow chart showing a processing procedure of call for MBean in a software development support system of the first exemplary embodiment of the present invention.
Figure 14:
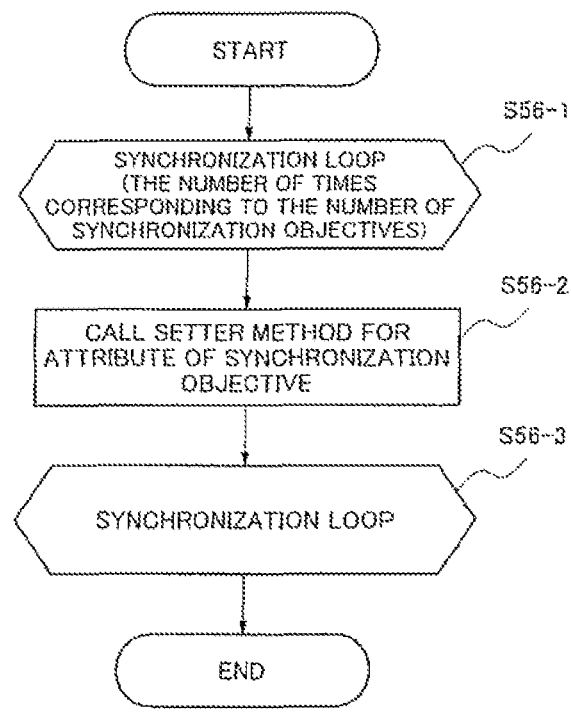
FIG. 14 is a flow chart showing a function extension processing procedure of synchronization of change information in a software development support system of the first exemplary embodiment of the present invention.

Next, a processing procedure in the software development support apparatus 10a of this exemplary embodiment will be described more in detail with reference to FIG. 5 and FIGS. 12-14. FIGS. 12-14 are flow charts showing a generation processing procedure of the MBean 50a, a calling processing procedure of the MBean 50a and a function extension processing procedure of synchronization of change information in a software development support system of this exemplary embodiment, in this order.

A developer creates an optional MBean class 40a according to JMX API (Java Management Extensions Application Programming Interface) in advance of processing in the software development support apparatus 10a of this exemplary embodiment.

On this occasion, instead of coding extended-functions, a developer codes optional annotation information corresponding to the respective functions. In such case, a developer codes individual pieces of annotation information so that they may be included in a class file of the MBean class 40a in a state being correlated to a method, a field, a constructor and the like in the MBean class 40a, respectively.

Then, the MBean generating unit 22a instantiates the MBean class 40a created by the developer as mentioned above and generates the MBean 50a. The MBean generating unit 22a stores the generated MBean 50a to an MBean memory unit in the MBean server 12a in the JMX agent 11a. Then, an MBean execution unit 27a reads and carries out the MBean 50a stored in the MBean memory unit based on a request from the operations management application 61. Meanwhile, in such as FIG. 1, the MBean memory unit is not illustrated.

When generating the MBean 50a, the MBean generating unit 22a reads the MBean class 40a from the MBean class memory unit 21a included in a class loader (Step S30). Then, the MBean generating unit 22a generates the MBean 50a and the MBeanInfo 51a corresponding to this MBean class 40a (Step S31). At that time, the MBeanInfo 51a does not include annotation information yet.

Next, the annotation analysis unit 30a determines whether the MBean class 40a includes annotation information or not (Step S32). When the annotation analysis unit 30a determines that the MBean class 40a does not include annotation information (NO at Step S32), the MBean generating unit 22a finishes processing after adding predetermined basic information to the MBeanInfo 51a.

When the annotation analysis unit 30a determines that the MBean class 40a includes annotation information (YES at Step S32), the annotation analysis unit 30a carries out analysis processing of annotation information (Steps S33-S37). This analysis processing of such annotation information is repeatedly carried out the number of times corresponding to the number of the method included in the MBean class 40a.

On this occasion, the annotation analysis unit 30a analyzes the annotation information and determines whether information about a structure, an attribute, operation and the like of the MBean 50a is included in the annotation information (Step S34).

When the annotation analysis unit 30a determines that the annotation information does not include information about a structure, an attribute, operation and the like of the MBean 50a (NO at Step S34), the MBean generating unit 22a carries out the following processing. That is, the MBean generating unit 22a finishes processing after adding predetermined basic information to the MBeanInfo 51a.

On the other hand, when the annotation analysis unit 30a determines that the annotation information includes such information (YES at Step S34), the MBean generating unit 22a carries out the following processing. That is, when the annotation information includes information about predetermined extended-functions, the MBean generating unit 22a generates one or more extended-function objects corresponding to the information about the predetermined extended-functions. The MBean generating unit 22a stores the generated extended-function objects to the extended-function memory unit 24a (Step S35).

The MBean generating unit 22a adds the annotation information to the MBeanInfo 51a (Step S36).

The MBean generating unit 22a performs processing of Steps S34-S36 repeatedly for each method indicated by the annotation information on the MBean class 40a (Step S37). The MBean generating unit 22a adds predetermined basic information to the MBeanInfo 51a and finishes processing.

At Step S34, when the annotation information includes information about a predetermined extended-function for information monitoring (refer to the annotation file 102 of FIG. 6, for example), the MBean generating unit 22a generates a monitor-dedicated MBean (JMX monitor MBean) and stores the monitor-dedicated MBean to the extended-function memory unit 24a.

When the operations management application 61 calls the MBean 50a corresponding to the monitor-dedicated MBean stored in the extended-function memory unit 24a, the extended-function execution unit 26a carries out the monitor-dedicated MBean.

Next, processing for calling the MBean 50a in the software development support apparatus 10a of this exemplary embodiment will be described with reference to FIG. 1, FIG. 5 and FIG. 13. FIG. 13 is a flow chart showing a calling processing procedure of the MBean 50a in a software development support system of this exemplary embodiment.

When the operations management application 61 of the administrator terminal 60 calls the MBean 50a via the MBean execution unit 27a, the MBean execution unit 27a outputs to the extended-function execution unit 26a information which indicates that the MBean 50a has been called, and the MBean execution unit 27a carries out the MBean 50a.

At this occasion, when interrupt processing (interceptor) which is for being performed before processing by the MBean 50a exists as an extended-function corresponding to the MBean 50a (YES at Step S50), the extended-function execution unit 26a identifies an extended-function object. Specifically, the extended-function execution unit 26a refers to the MBean extended-function correspondence table 25a and identifies the extended-function object corresponding to the MBean 50a for carrying out the interrupt processing. Then, the extended-function execution unit 26a acquires the identified extended-function object from the extended-function memory unit 24a, and carries out interrupt processing by carrying out the extended-function object (Step S51).

By such as determining whether annotation information which defines the extended-function exists or not by referring to the MBeanInfo 51a, the MBean execution unit 27a may determine whether interrupt processing exists or not as an extended-function corresponding to the MBean 50a. The same applies to other extended-functions. Note that, the extended-function execution unit 26a may perform such determination.

Next, the MBean execution unit 27a checks whether an argument value which is given to the MBean 50a is effective or not (Step S52). This argument value is a value which is passed as arguments to a "setter method" or an "operation method" included in the MBean 50a. When this argument value is invalid (NO at Step S52), the MBean execution unit 27a issues a JMX exception and finishes processing (Step S53). That is, the MBean execution unit 27a returns error information or the like which is an appropriate exception specified by the JMX specification to the operations management application 61.

When the argument value is valid (YES at Step S52), the MBean execution unit 27a calls a predetermined method included in the MBean 50a and carries out the MBean 50a (Step S54).

Next, when synchronization processing exists as an extended-function corresponding to the MBean 50a (YES at Step S55), the extended-function execution unit 26a identifies an extended-function object. Specifically, the extended-function execution unit 26a refers to the MBean extended-function correspondence table 25a, and identifies the extended-function object corresponding to the MBean 50a for carrying out the synchronization processing. Then, the extended-function execution unit 26a acquires the identified extended-function object from the extended-function memory unit 24a, and carries out synchronization processing by carrying out the extended-function object (Step S56).

As shown in FIG. 14, this synchronization processing (from Step S56-1 to Step S56-3) repeats calling of a setter method for the attribute of a target of synchronization (Step S56-2) the number of times corresponding to the number of attributes. By this synchronization processing, management information for attributes and operation having a dependence relationship is updated in the extended-function execution unit 26a. In the example of the annotation file 105 of FIG. 7, "SampleValue2" which is an attribute of a target is synchronized by updating "SampleValue2" with "sampleValue".

Next, when interrupt processing which is for being performed after processing by the MBean 50a exists as an extended-function corresponding to the MBean 50a (YES at Step S57), the extended-function execution unit 26a identifies an extended-function object. Specifically, the extended-function execution unit 26a refers to the MBean extended-function correspondence table 25a and identifies the extended-function object corresponding to the MBean 50a for carrying out the interrupt processing. Then, the extended-function execution unit 26a acquires the identified extended-function object from the extended-function memory unit 24a, and carries out interrupt processing by carrying out the extended-function object (Step S58).

As a result, the operations management application 61 of the administrator terminal 60 that is a JMX client calls the MBean 50a and carries out processing such as update and operation of information of a management objective of the MBean 50a (the EJB container 81 and the web container 91).

As it has been described above, the software development support apparatus 10a of this exemplary embodiment can give an extended-function which enables to carry out processing which is customized more highly and more in detail than the JMX specification to the MBean 50a.

In otherwords, the software development support apparatus 10a of this exemplary embodiment applies a concept of a container in Java to MBean in a way that the existing JMX specification is extended. By this, the software development support apparatus 10a of this exemplary embodiment can carry out work specific to a monitoring and management application such as initialization processing, a parameter check and securing consistency between MBeans, in a common manner in the server side. This means that, when integrated operational control is performed in large-scale applications or the like, the effect of applying the software development support apparatus 10a of this exemplary embodiment is high in particular.

The software development support apparatus 10a of this exemplary embodiment reduces the amount of code generation by a developer substantially.

The reason is as follows. In the existing related technology, a developer itself has to perform definition work of initial values of management information, parameter check processing and synchronization of information. On the other hand, according to this exemplary embodiment, if a developer newly defines annotation information for performing processing corresponding to definition of initial values of management information, parameter check processing and synchronization of information, the MBean container 20a manages and controls the annotation information. Accordingly, about a code, a developer should generate only essential codes for operation management.

The software development support apparatus 10a of this exemplary embodiment facilitates evaluation work for the operations management application 61 and the MBean 50a.

The reason is as follows. In the existing related technology, in order to test a code which generates the MBean 50a, it is necessary to operate the code on an exclusive MBean server 12a. On the other hand, by using annotation information, the software development support apparatus 10a of this exemplary embodiment can remove a code for such as initial value definition of management information, perpetuation processing and synchronization, which a developer itself has to create in the previous related technology, from an implemented logic in the MBean class 40a. Also, in the software development support apparatus 10a of this exemplary embodiment, a code for generating the MBean 50a can be evaluated easily using a test framework such as a unit test and JUnit. Further, the software development support apparatus 10a of this exemplary embodiment can implement and debug cross-sectional and common processing such as log output and performance measurement easily by using annotation information for performing interrupt processing of an MBean method.

The Second Exemplary Embodiment

Figure 15:
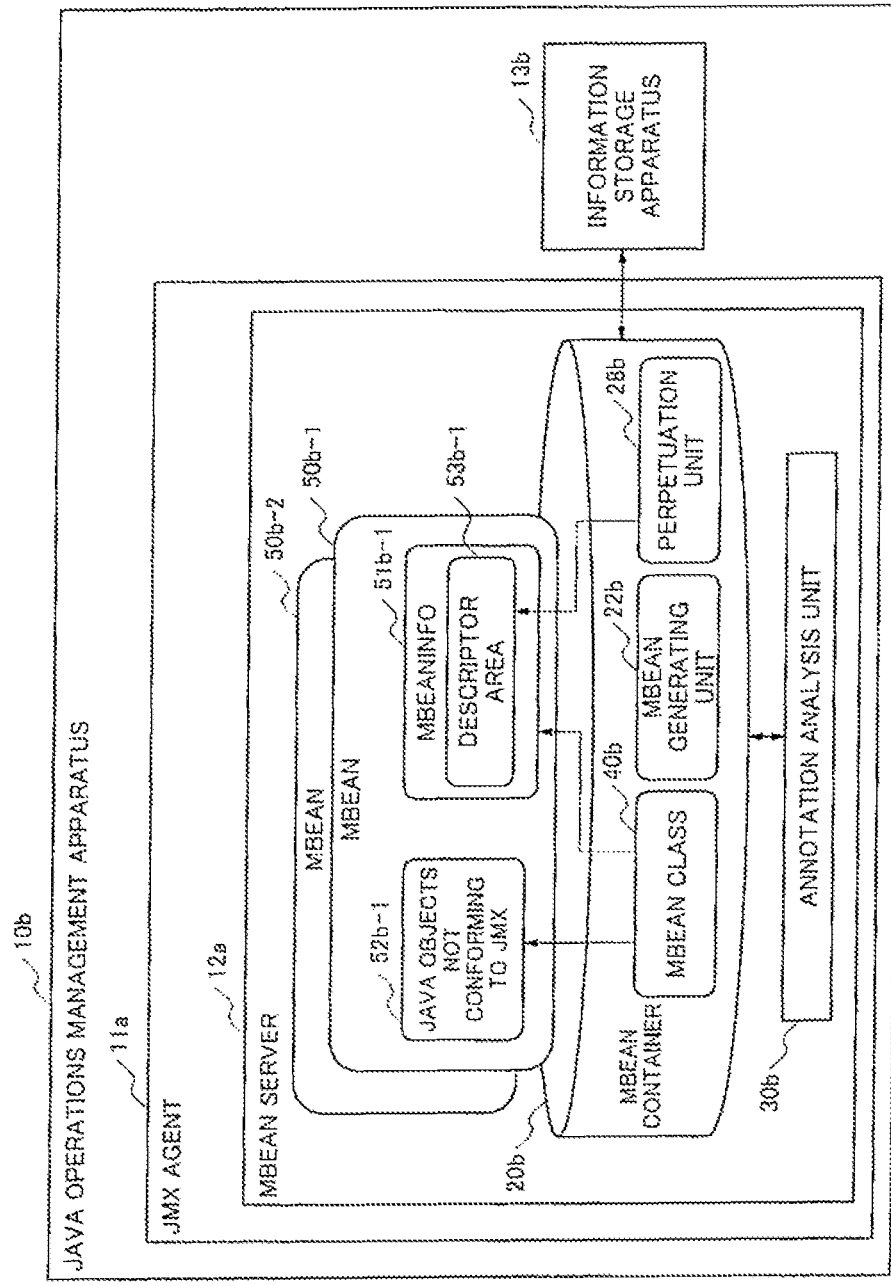
FIG. 15 is a block diagram showing a structure of a software development support apparatus of the second exemplary embodiment of the present invention.

Next, the second exemplary embodiment of the present invention will be described with reference to FIG. 15. FIG. 15 is a block diagram showing a structure of a software development support apparatus 10b (Java operations management apparatus) of this exemplary embodiment.

This exemplary embodiment is different from the first exemplary embodiment in a point that. Model MBean is used as a type of MBean in the JMX specification. About other points, it is the same as those of the first exemplary embodiment. Model MBean is a kind of Dynamic MBean.

In Model MBean, an existing Java object 52b (52b-1, 52b-2, . . . ) not conforming to JMX is modeled and managed like MBean.

That is, as shown in FIG. 15, the existing Java object 52b is included in a part of an MBean 50b. MBeanInfo 51b (51b-1, 51b-2, . . . ) corresponding to MBean 50b may include a descriptor area 53b (53b-1, 53b-2, . . . ).

Thus, by the MBeanInfo 51b including the descriptor area 53b, supplementary information may be included in the descriptor area 53b. Such supplementary information includes information such as information about a display method for use in an operations management application (displayName and visibility), information about an initial value of data (default) and information about a persistence property of data (persistPolicy), for example.

In addition to management information such as attribute information and operational information, such supplementary information may be used as a component of the MBeanInfo 51b.

In this exemplary embodiment, an MBean class 40b includes such supplementary information as annotation information in addition to the structure in the first exemplary embodiment. Further, on an occasion of generation of the MBean 50b, the MBean generating unit 22b performs an update by adding this annotation information to the descriptor area 53b. And then the MBean generating unit 22b generates the MBeanInfo 51b based on the updated descriptor area 53b.

According to this exemplary embodiment, management information about the MBean 50b including supplementary information is perpetuated by an information storage apparatus 13b, and the state of an object concerned is stored semi-permanently. Accordingly, the software development support apparatus 10b of this exemplary embodiment can restore the MBeanInfo 51b and the MBean 50b at any time.

Figure 16:
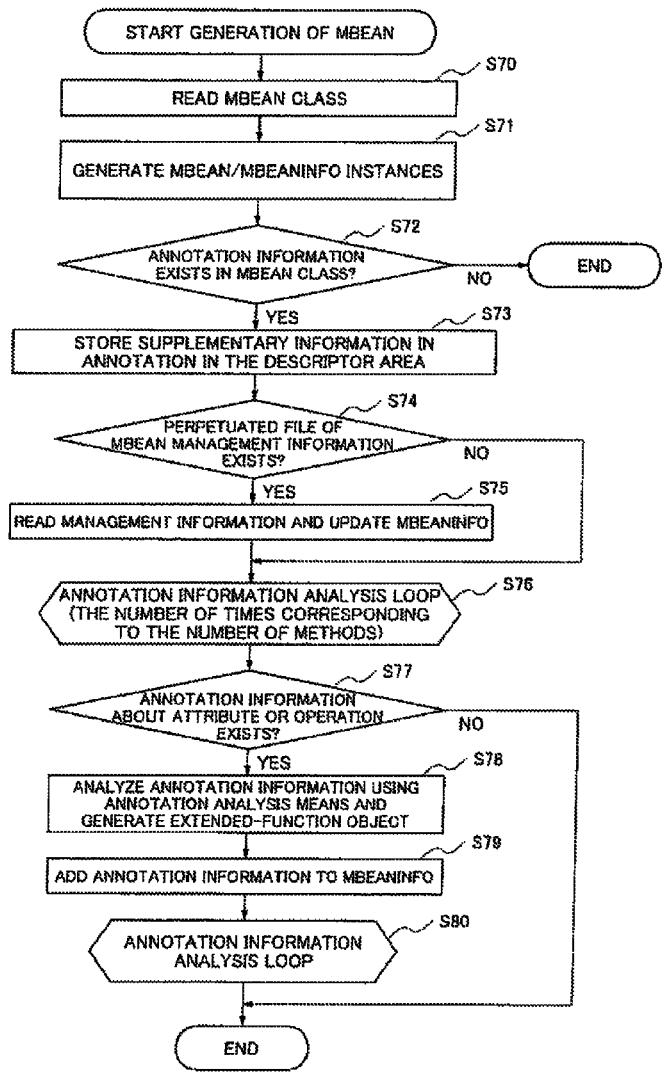
FIG. 16 is a flow chart showing a processing procedure of MBean generation in a software development support system of the second exemplary embodiment of the present invention.

Next, generation processing of the MBean 50b in the software development support apparatus 10b of this exemplary embodiment will be described with reference to FIG. 16. FIG. 16 is a flow chart showing a generation processing procedure of the MBean 50b in a software development support system of this exemplary embodiment.

In order to generate the MBean 50b which is an operations management objective, the software development support apparatus 10b of this exemplary embodiment may use the existing MBean class 40b.

As such an existing MBean class, a standard ModelMBean class called RequiredModelMBean is provided in the JMX specification. The software development support apparatus 10b of this exemplary embodiment may use RequiredModelMBean and or may generate and use a subclass of RequiredModelMBean.

On this occasion, instead of coding an extended-functions used in operations management, a developer adds annotation information corresponding to the respective functions to a method, a field and a constructor of the above-mentioned existing MBean class 40b. By this, the software development support apparatus 10b of this exemplary embodiment can generate the MBean 50b and the MBeanInfo 51b based on this existing MBean class 40b like the first exemplary embodiment.

The generation processing procedure of the MBean 50b in the software development support apparatus 10b of this exemplary embodiment is similar to each processing procedure in the software development support apparatus 10a of the first exemplary embodiment. Specifically, each processing step from the reading processing of the MBean class 40b to the existence determination processing of annotation information (Steps S70-S72) is similar to the each processing step in Steps S30-S32 of the first exemplary embodiment. Each processing step of the annotation information analysis loop (Steps S76-S80) is similar to the each processing step in Steps S33-S37.

On the other hand, according to this exemplary embodiment, an MBean generating unit 22b stores the supplementary information mentioned above to a descriptor area 53b-1 as an initial value of supplementary information to be included in the MBeanInfo 51b (Step S73). Such supplementary information is information which is defined in annotation information in the annotation file 106 and 107 shown in FIG. 7, for example.

According to this exemplary embodiment, management information about the MBean 50b is perpetuated by an information storage apparatus 13b. When perpetuated management information exists in the information storage apparatus 13b (YES at Step S74), the MBean generating unit 22b updates annotation information of the MBeanInfo 51b according to this perpetuated management information. On this occasion, the initial value of supplementary information stored in the descriptor area 53b-1 is updated by the supplementary information in the perpetuated management information (Step S75).

Note that, processing based on the annotation information besides annotation information mentioned above in generation processing of the MBean 50b of this exemplary embodiment is similar to the processing in the first exemplary embodiment. That is, the processing based on the annotation information besides annotation information mentioned above is processing such as information monitoring processing by a JMX monitor function, interrupt processing (interceptor), processing for checking the validity of an argument when executing a setter method or an operation method and processing for synchronizing change information.

Figure 17:
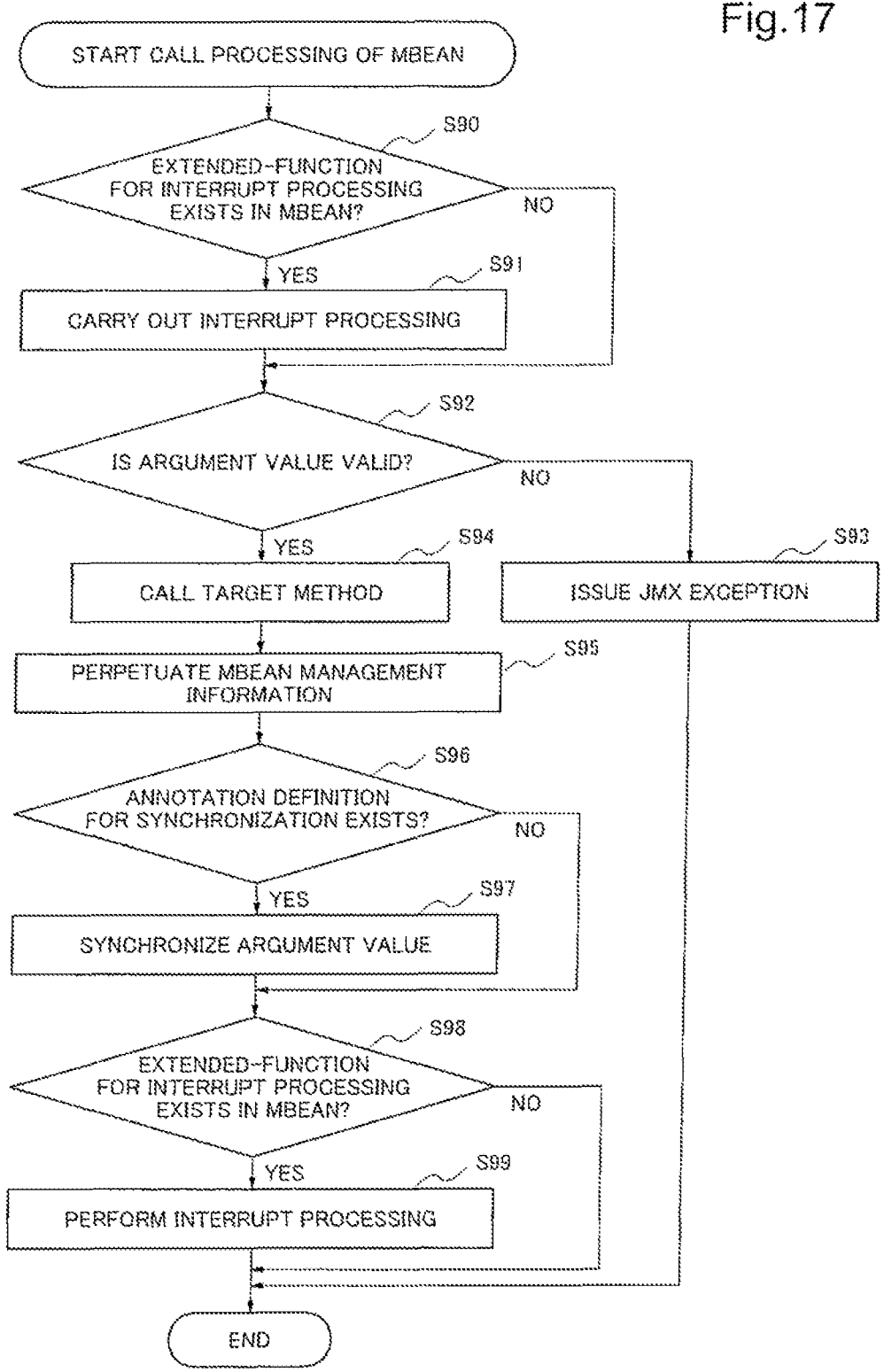
FIG. 17 is a flow chart showing a processing procedure of call for MBean in a software development support system of the second exemplary embodiment of the present invention.

Next, calling processing of the MBean 50b in the software development support apparatus 10b of this exemplary embodiment will be described with reference to FIG. 17. FIG. 17 is a flow chart showing a calling processing procedure of MBean in a software development support system of this exemplary embodiment.

The calling processing procedure of the MBean 50b in the software development support apparatus 10b of this exemplary embodiment is similar to each processing in the software development support apparatus 10a of the first exemplary embodiment. Specifically, each processing besides the perpetuation processing of management information of MBean in Step S95 (Steps S90-S94 and Steps S96-S99) is similar to the each processing of Steps S50-S54 and Steps S56-S55 of the first exemplary embodiment.

While, according to this exemplary embodiment, in order to perpetuate management information and the like about the MBean 50b, the following processing is performed at Step S95. When a target method of such as a setter method or an operation method is carried out, a perpetuation unit 20b in an MBean container 20b stores annotation information including management information on the MBeanInfo 51b to the information storage apparatus 13b (Step S95). For example, when such as synchronization is performed based on the annotation file 105 of FIG. 7, the perpetuation unit 28b stores to the information storage apparatus 13b annotation information in the updated MBeanInfo 51b.

Then, when this perpetuated management information exists, the MBeanInfo 51b is updated using this management information in the generation processing of the MBean 50b as mentioned above, and supplementary information stored in the descriptor area 53b-1 is also updated.

As it has been described above, on the occasion that the MBean 50b including the existing Java object 52b is generated, the software development support apparatus 10b of this exemplary embodiment can generate an extended-function object using annotation information like a case in the first exemplary embodiment. The software development support apparatus 10b of this exemplary embodiment can also generate the MBeanInfo 51b including annotation information.

The software development support apparatus 10b of this exemplary embodiment can include in the descriptor area 53b-1 of the MBeanInfo 51b supplementary information in annotation information, and also can perpetuate such annotation information. Thus, the software development support apparatus 10b of this exemplary embodiment can update annotation information of the MBeanInfo 51b using this perpetuated annotation information.

The Third Exemplary Embodiment

Figure 18:
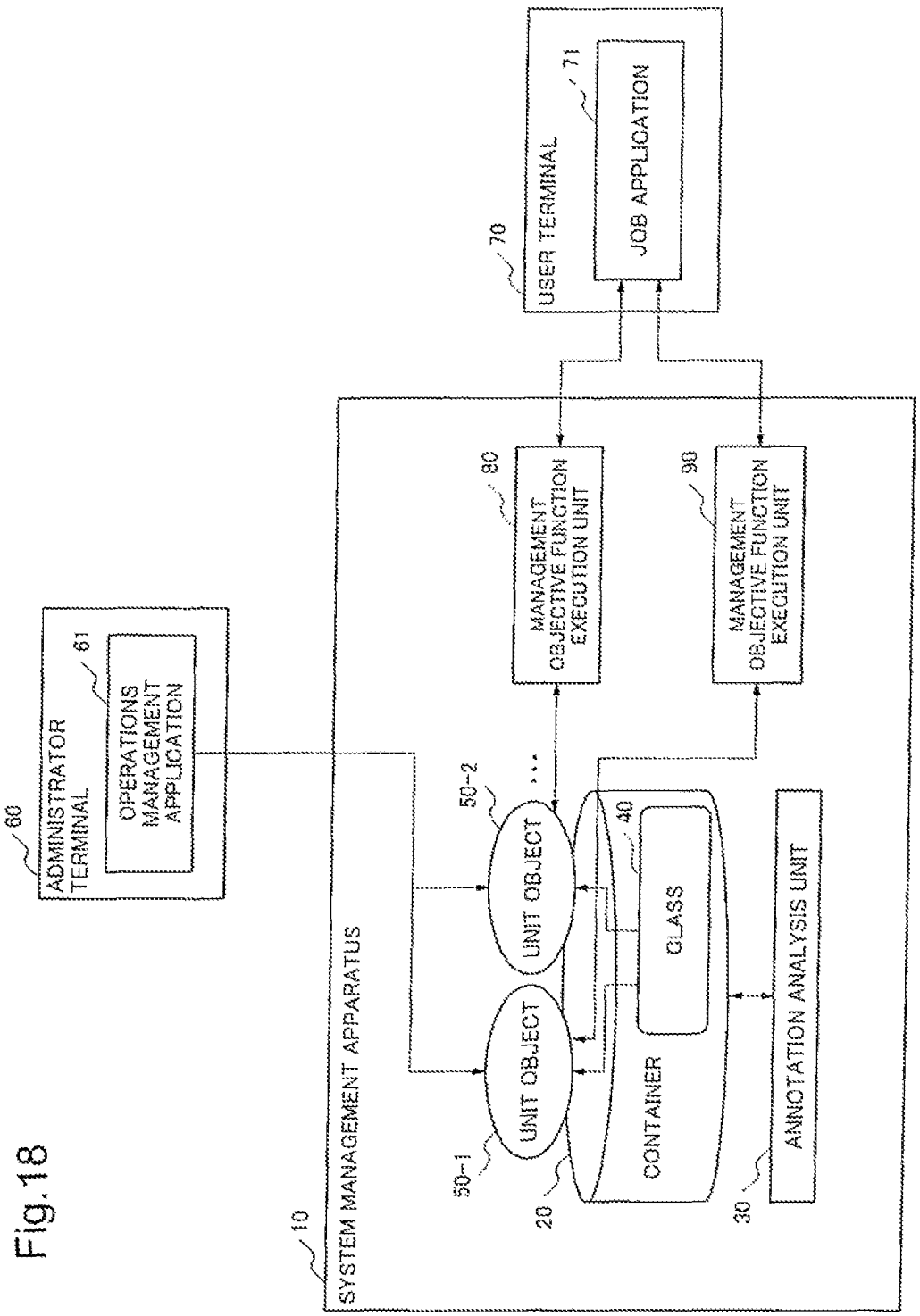
FIG. 18 is a block diagram showing a structure of a software development support system of a third exemplary embodiment of the present invention.
Figure 19:
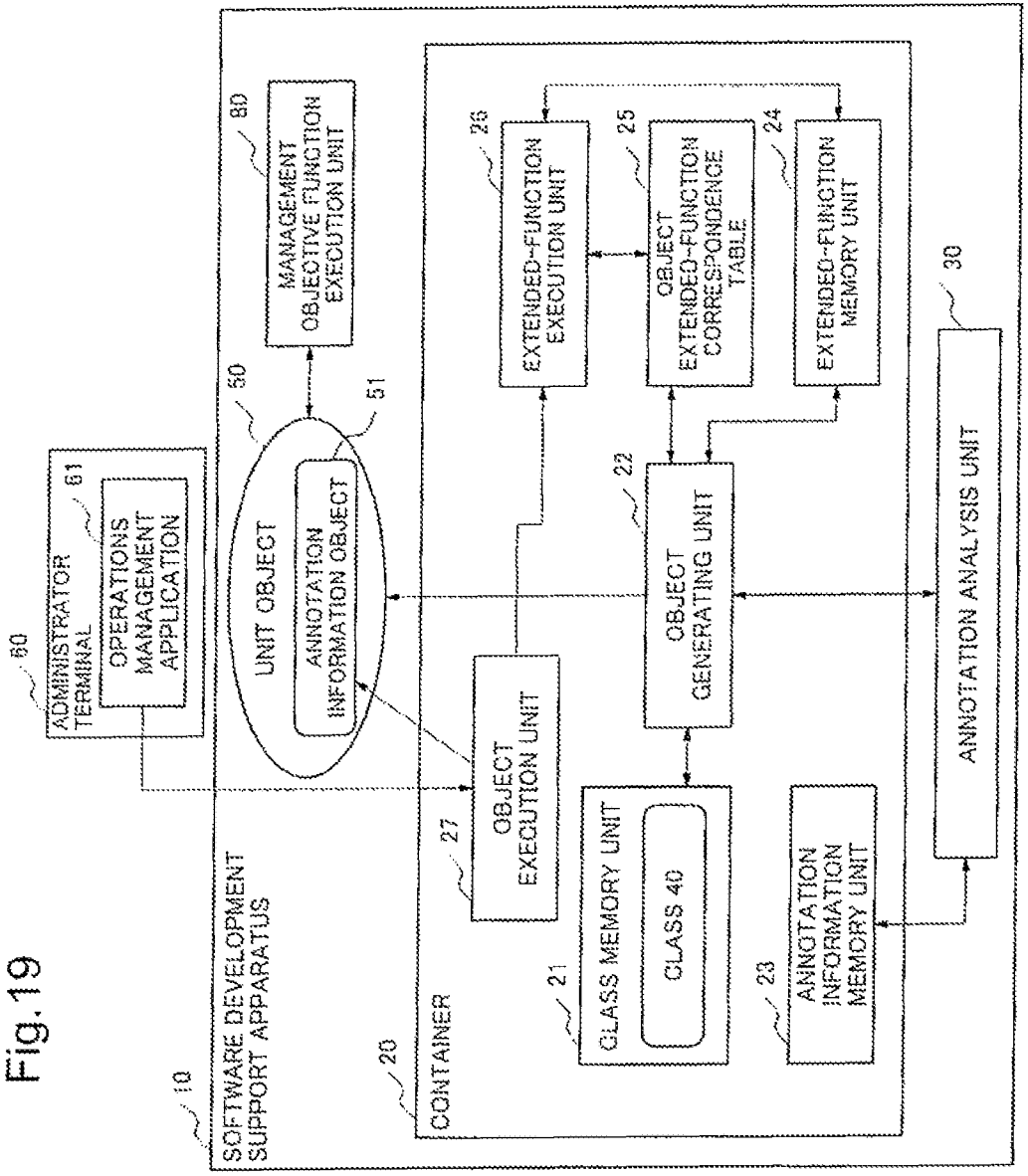
FIG. 19 is a block diagram showing a structure of a container in a software development support system of the third exemplary embodiment of the present invention.

Next, the third exemplary embodiment of the present invention will be described with reference to FIG. 18 and FIG. 19. FIG. 18 is a block diagram showing a structure of a software development support system of this exemplary embodiment, and FIG. 19 is a block diagram showing a structure of a container in the system.

A software development support system of this exemplary embodiment is a system in which a software development support system constituted as a Java operations management system in the first exemplary embodiment is applied to an execution and development environment of a program written in an object-oriented programming language besides Java. That is, this exemplary embodiment is the same as the first exemplary embodiment except for a point that an object-oriented programming language which is used is not limited to Java.

As shown in FIG. 18, a software development support system of this exemplary embodiment includes a software development support apparatus (system management apparatus) 10 and an administrator terminal 60.

This software development support apparatus 10 corresponds to the software development support apparatus (Java operations management apparatus) 10a in the first exemplary embodiment. This software development support apparatus 10 includes a container 20, an annotation analysis unit 30 and a unit object 50 (50-1, 50-2, . . . ). These correspond to the MBean container 20a, the annotation analysis unit 30a and the MBean 50a in the first exemplary embodiment, respectively.

The container 20 is an object management means for generating and storing various objects and for performing various operations to these objects and attribute data or the like of the objects.

The container 20 includes the class 40 for generating the unit object 50. The container 20 generates the unit object 50 corresponding to the class 40 using this class 40. On the occasion of generating this unit object 50, the annotation analysis unit 30 analyzes annotation information included in the class 40. Then, the container 20 generates an extended-function object and carries out the generated extended-function object.

As shown in FIG. 19, the container 20 has a class memory unit 21, an object generating unit 22, an annotation information memory unit 23, an extended-function memory unit 24, an object extended-function correspondence table 25 and an extended-function execution unit 26. The class memory unit 21 stores the class 40. The object generating unit 22 generates the unit object 50. The annotation information memory unit 23 stores annotation information used when the annotation analysis unit 30 performs analysis. The extended-function memory unit 24 stores an extended-function object which the object generating unit 22 generates. The object extended-function correspondence table 25 stores a corresponding relationship between the unit object 50 and an extended-function object. The extended-function execution unit 26 carries out an extended-function object.

As shown in FIG. 19, the unit object 50 includes an annotation information object 51. This annotation information object 51 corresponds to the MBeanInfo 51b in the first exemplary embodiment. The annotation information object 51 is generated by the object generating unit 22 along with generation of the unit object 50.

The function of the unit object 50 in this exemplary embodiment is not limited in particular. For example, the unit object 50 may update and operate various information in a predetermined management objective function execution unit 80 and 90, or may acquire these information. In an example of FIG. 18, the management objective function execution unit 80 and 90 carry out a object which is the management objective based on a request from the job application 71 in the user terminal 70.

According to this exemplary embodiment, on an occasion of generation of the unit object 50, the annotation analysis unit 30 analyzes annotation information included in the class 40. When annotation information for carrying out an extended-function is included in this annotation information, the object generating unit 22 in the software development support apparatus (system management apparatus) 10 generates an extended-function object defined in the annotation information. The object generating unit 22 also generates the annotation information object 51 including this annotation information.

The operations management application 61 in the administrator terminal 60 connected to the software development support apparatus 10 can refer to this annotation information object 51.

Then, the operations management application 61 calls the unit object 50 and the unit object execution unit 27 carries out the unit object 50. The extended-function execution unit 26 refers to the object extended-function correspondence table 25 and identifies the extended-function object corresponding to the unit object 50. The extended-function execution unit 26 acquires the identified extended-function object from the extended-function memory unit 24 and carries out the extended-function object.

Such software development support apparatus 10 of this exemplary embodiment has the same effect as the first exemplary embodiment. In other words, because the software development support apparatus 10 can generate an extended-function object and the annotation information object 51 which extend the function of a unit object, it becomes possible to generate an extended-function object or the like which has a function customized highly and in detail with a less code amount.

Further, the software development support apparatus 10 of this exemplary embodiment may include the same structure as the Java operations management apparatus 10b in the second exemplary embodiment. That is, the software development support apparatus 10 may make management information perpetuated by: an annotation information object including a descriptor area; a container including a perpetuation unit; and making supplementary information be included in a descriptor area.

The Fourth Exemplary Embodiment

Figure 20:
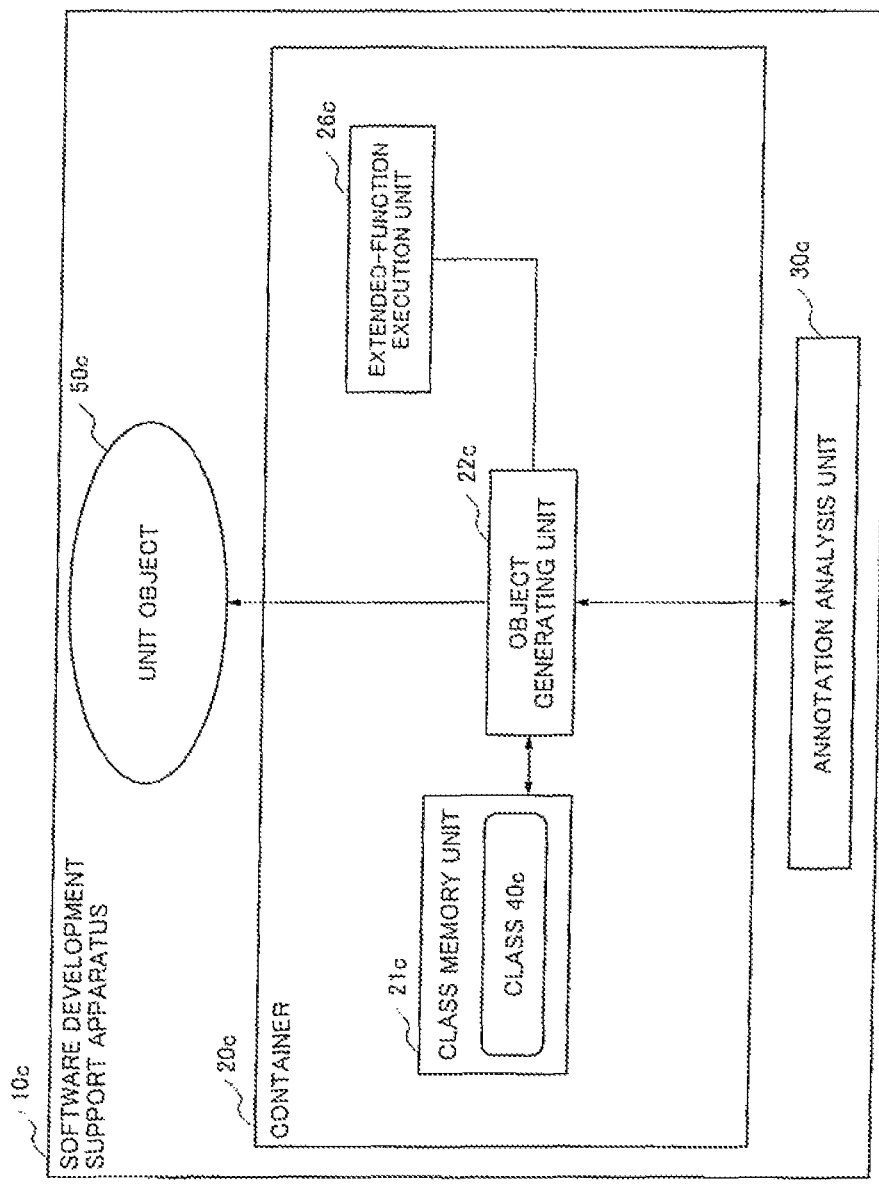
FIG. 20 is a block diagram showing a structure of a software development support apparatus of a fourth exemplary embodiment of the present invention.

Next, the fourth exemplary embodiment of the present invention will be described with reference to FIG. 20. FIG. 20 is a block diagram showing a structure of a software development support apparatus 10c of this exemplary embodiment.

The software development support apparatus 10c of this exemplary embodiment includes a container 20c and an annotation analysis unit 30c.

The container 20c is an object management means for generating and storing various objects and for performing various operations to these objects and attribute data or the like of the objects.

The container 20c includes a class 40c for generating a unit object 50c. The container 20c generates the unit object 50c corresponding to the class 40c using this class 40c. On an occasion of generating this unit object 50c, the annotation analysis unit 30c analyzes annotation information which is information included in the class 40c and indicating the attribute of the class 40c or operation to the class 40c. Then, the container 20c generates an extended-function object and carries out the generated extended-function object.

As shown in FIG. 20, the container 20c has a class memory unit 21c, an object generating unit 22c and an extended-function execution unit 26c. The class memory unit 21c stores the class 40c for generating one or more unit object 50c for performing predetermined processing. The object generating unit 22c reads the class 40c stored in the class memory unit 21c, and generates the unit object 50c. When the annotation analysis unit 30c determines that the class 40c includes the annotation information the object generating unit 22c performs following processing. That is, the object generating unit 22c generates an extended-function object which adds to the class 40c an attribute of the class 40c or operation to the class 40c indicated by the annotation information on an occasion of generating the unit object 50c. The extended-function execution unit 26c carries out the extended-function object which the object generating unit 22c generates. At the time when the unit object 50c corresponding to the class 40c is called from a predetermined application and carried out, the extended-function execution unit 26c carries out the extended-function object corresponding to the class 40c.

According to this exemplary embodiment, when generating the unit object 50c, the annotation analysis unit 30c analyzes annotation information included in the class 40c. When predetermined annotation information is included in this annotation information, the object generating unit 22c in the software development support apparatus 10c generates an extended-function object defined in the annotation information.

An administrator terminal which is not illustrated and connected to the software development support apparatus 10c calls the unit object 50c and the software development support apparatus 10c carries out the object. The extended-function execution unit 26c identifies an extended-function object corresponding to the unit object 50. The extended-function execution unit 26c carries out the identified extended-function object.

Such software development support apparatus 10c of this exemplary embodiment has the same effect as the first exemplary embodiment. Because the software development support apparatus 10c can generate an extended-function object and an annotation information object which extend the function of a unit object, it becomes possible to generate an extended-function object or the like which has a function customized highly and in detail with a less code amount.

The Fifth Exemplary Embodiment

The fifth exemplary embodiment of the present invention is a software development support system having: a software development support apparatus including a class memory unit, an object generating unit, an annotation analysis unit and an extended-function execution unit; and a terminal connected to this software development support apparatus. The class memory unit stores a class for generating at least one unit object which carries out predetermined processing. The object generating unit reads the class and generates the unit object. The annotation analysis unit determines whether or not the class includes annotation information which indicates an attribute of the class or operation to the class. The extended-function execution unit carries out an extended-function object corresponding to the class.

When the annotation analysis unit determines that the class includes the annotation information, the object generating unit generates the extended-function object which adds to the class an attribute of the class or operation to the class indicated by the annotation information on an occasion of generating the unit object. When the unit object corresponding to the class is called from the terminal and the unit object is carried out, the extended-function execution unit carries out the extended-function object corresponding to the class.

In recent years, a general-purpose framework for implementation and operations management of a Java™ application called JMX has appeared. By this framework, a developer can monitor and Manage various Java applications through a general-purpose API (Application Programming Interface).

That is, by this specification, without using an API and a function for operations management provided uniquely by Java applications in the past, a developer can access a monitoring/management objective using a common method even in any Java application.

However, most of these specifications for the general-purpose API are for a basic purpose yet, and only basic application processing such as access to management information, execution of operation and notification of an event has been standardized.

On the other hand, when JMX is used for development of a system for managing an enterprise large-scale server application, in order for a management objective to be managed efficiently and in detail, it is not enough only to use JMX just as it is. A developer has needed to describe a code for performing various kinds of additional implementation to JMX for MBean (Managed Bean) which is a Java object which becomes a monitoring or a management objective.

For example, when JMX is applied to an application server and a server application for performing process monitoring and computer monitoring and the like, a developer has to prepare functions such as for an initializing process of MBean, status monitoring and synchronizing updated information with other MBeans.

Several types of MBeans exist in the JMX specification. Among MBeans, there is an MBean in which the MBean itself possesses metadata (such as an item name) of information which the MBean manages. There is a case where a developer him/herself needs to create the entire definition of an object called MBeanInfo which is definition information for enabling this metadata to be referred to from a predetermined application. The number of lines of such object definition stretches to several dozen-hundred lines in large cases.

Also, in such additional implementations, there are a lot of common portions in individual MBeans. Accordingly, it is not desirable that individual developers of MBean describe a similar code independently with each other. JMX has been specified only recently, and there are not a lot of developers who can perform implementation using API yet.

From the above, a developer cannot concentrate his/her energy on implementation of essential operations management logics, and thus there has been a problem that the more the scale of implementation becomes large, the more difficult it will be to improve development efficiency.

The above-mentioned problem is a problem which one faces when realizing high level operations management in JMX. The more a range to which JMX is applied becomes large, the larger its implementation volume will be, and as a result, there may be a case where the work volume and the work level are not improved in comparison with those before JMX introduction. Under such condition, advantage of applying JMX fades away.

For example, about EJB and Servlet, by using annotation information about processing specialized in EJB and Servlet, it is possible to reduce the work volume. Processing specialized in EJB and Servlet includes processing of acquiring an object from a service of JNDI (Java Naming and Directory Interface), controlling transactions and defining relation to a database and associating with a Java object, for example.

By EJB and Servlet, a developer can implement the functions similar to those of the past with a less code amount than before. However, a scheme to utilize annotation information is not enough for use in monitoring and managing an application yet. Also, when an operations management application is developed, a developer cannot implement the functions similar to those of the past with a less code amount than before. In addition, although tools and API for making development of JMX efficient are provided by several open sources, those tools and API are in a state that they are not becoming popular sufficiently.

Programs by JMX have relation with life cycle processing such as initialization of all job applications, and they operate as a basis of an application execution foundation. Accordingly, it is desirable that an application developer is able to implement a operations management function without being conscious of behavior of an object in the JMX layer (lower layer) as far as possible.

The debugging supporting method described in patent document 1 can extract annotation information embedded in a method definition section and analyze the extracted information. However, the debugging supporting method described in patent document 1 is a method for converting annotation information into a form that can be evaluated on a debugger based on an analysis result, and thus it is not possible to apply it to reduction in the volume of a program using JMX and to automation or the like of processing for monitoring and management. Accordingly, the debugging supporting method described in patent document 1 cannot achieve simplification of coding related to JMX or the like.

Further, the language interpretation display method described in patent document 2 can extract and analyze annotation information embedded in HTML. However, the language interpretation display method described in patent document 2 is a method for customizing a screen display based on the analyzed annotation information, and thus it is not possible to apply it to reduction in the volume of a program using JMX and to automation or the like of processing for monitoring and management. Accordingly, the language interpretation display method described in patent document 2 cannot achieve simplification of coding related to JMX or the like.

An exemplary advantage according to the invention is that it is possible to generate an extended-function object and MBeanInfo or the like which extend the function of a unit object such as MBean related to monitoring or management. Another exemplary advantage according to the invention is that it is possible to perform processing customized more highly and more in detail than the JMX specification with a less code amount.

The present invention is not limited to the above mentioned exemplary embodiments, and it is not necessary to say that various modified implementations are possible within the scope of the present invention.

For example, according to each of the above-mentioned exemplary embodiments, although it is structured such that a unit object of MBean is accessed by being called from an operations management application in an administrator terminal, it is not limited to this. for example, the structure of access to a unit object may be changed appropriately to such as a structure in which the unit object is called from another application in a general user terminal.

INDUSTRIAL APPLICABILITY

The present invention can be used suitably when a developer customizes a server application for performing monitoring and management more highly and more in detail than the JMX specification, and in particular when a developer performs integrated operational control in a large-scale application or the like. When the present invention is applied to a product project for developing an application server and a server application for process monitoring and computer control, for example, each developer does not need to make up a common and complicated implementation from scratch. Such implementation includes implementations needed for initializing processing, a parameter check, synchronization of information and information monitoring, for example. Accordingly, each developer can concentrate his/her energy only on logics needed for operations management.

When the present invention is applied to a product called IDE (integrated development environment), such IDE can perform complementation of a code and automatic generation of a related source code. Accordingly, this IDE can provide an environment for operations management application development that is made more efficient.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The whole or part of the exemplary embodiments disclosed above can be described as, but not limited to, the following supplementary notes.

(Supplementary Note 1)

A software development support system comprising:

a software development support apparatus which includes: a class memory unit which stores a class for generating at least one unit object which carries out predetermined processing; an object generating unit which reads said class and generates said unit object; an annotation analysis unit which determines whether or not said class includes annotation information which indicates an attribute of said class or operation to said class; and an extended-function execution unit which carries out an extended-function object corresponding to said class; and a terminal connected to said software development support apparatus, wherein when said annotation analysis unit determines that said class includes said annotation information, said object generating unit generates said extended-function object which adds to said class an attribute of said class or operation to said class indicated by said annotation information on an occasion of generating said unit object, and wherein when said unit object corresponding to said class is called from said terminal and said unit object is carried out, said extended-function execution unit carries out said extended-function object corresponding to said class.

(Supplementary Note 2)

A software development support system according to Supplementary note 1, wherein when said annotation analysis unit determines that said class includes said annotation information, said object generating unit generates an annotation information object which includes said annotation information and which said terminal can refer to on a occasion of generation of said unit object.

(Supplementary Note 3)

A software development support system according Supplementary note 2, wherein said annotation information includes at least information which indicates whether said annotation information is perpetuated or not, wherein said software development support apparatus further comprising:

an information storage apparatus which stores said annotation information and information indicating said unit object while correlating said annotation information and said information indicating said unit object; and a perpetuation unit which determines whether to perpetuate said annotation information or not based on said annotation information, and wherein said perpetuation unit stores said annotation information to said information storage apparatus when said perpetuation unit determined to perpetuate said annotation information.

(Supplementary Note 4)

A software development support system according to Supplementary note 3, wherein said annotation information includes at least information which indicates whether said annotation information is initialized or not, and wherein said object generating unit initializes annotation information included in said unit object based on said annotation information when said annotation information corresponding to said unit object is stored in said information storage apparatus.

EXPLANATION OF LETTERS OR NUMERALS

10 Software development support apparatus (system management apparatus)
10a and 10b Software development support apparatus (Java operations management apparatus)
10c Software development support apparatus
11a JMX agent
12a MBean server
13a (13a-1, 13a-2, . . . ) Service
13b Information storage apparatus
20 and 20c Container
20a and 20b MBean container
21 and 21c Class memory unit
21a MBean class memory unit
22 and 22c Object generating unit
22a and 22b MBean generating unit
23 and 23a Annotation information memory unit
24 and 24a Extended-function memory unit
25 Object extended-function correspondence table
25a MBean extended-function correspondence table
26, 26a and 26c Extended-function execution unit
27 Unit object execution unit
27a MBean execution unit
28b Perpetuation unit
30, 30a and 30c Annotation analysis unit
40 and 40c Class
40a and 40b MBean class
50 (50-1 and 50-2) and 50c Unit object
50a (50a-1, 50a-2, . . . ) and 50b (50b-1, 50b-2, . . . ) MBean
51 Annotation information object
51a (51a-1, 51a-2, . . . ) and 51b (51b-1, 51b-2, . . . ) MBean-Info
52b (52b-1, 52b-2, . . . ) Existing Java object
53b (53b-1, 53b-2, . . . ) Descriptor area
60 Administrator terminal
61 Operations management application
70 User terminal
71 Job application
80 and 90 Management objective function execution unit
81 EJB container
82 (82-1, 82-2 and*) EJB
91 Web container
92 (92-1, 92-2, . . . ) Servlet
101, 102, 103, 104, 105, 106, 107 Annotation file
201 and 203 File
202 Compiler
204 Class loader

What is claimed is:

1. A software development support apparatus comprising:
a central processing unit which generates an Mbean instance for Java® Management Extensions Application Programming Interface based on an Mbean class for generating said Mbean instance which carries out predetermined processing,
determines whether or not said Mbean class includes annotation information which indicates an attribute of said Mbean class or operation to said Mbean class, and
carries out an extended-function object corresponding to said Mbean class; and
a memory unit which stores said Mbean class, wherein,
when said central processing unit determines that said Mbean class includes said annotation information, said central processing unit generates said extended-function object which adds to said Mbean class an attribute of said Mbean class or operation to said Mbean class indicated by said annotation information on an occasion of generating said Mbean instance, and wherein
when said Mbean instance corresponding to said Mbean class is called from a predetermined application and carried out, said central processing unit carries out said extended-function object corresponding to said Mbean class.

2. A software development support apparatus according to claim 1, wherein
when said central processing unit determines that said Mbean class includes said annotation information, said central processing unit generates an annotation information object which includes said annotation information and which a terminal connected to said software development support apparatus can refer to on an occasion of generating said Mbean instance.

3. A software development support apparatus according to claim 2, wherein
said annotation information includes at least information which indicates whether said annotation information is perpetuated or not, wherein said software development support apparatus further comprising:
an information storage apparatus which stores said annotation information and information indicating said Mbean instance while correlating said annotation information and said information indicating said Mbean instance; and said central processing unit which determines whether to perpetuate said annotation information or not based on said annotation information, and wherein
said central processing unit stores said annotation information to said information storage apparatus when said central processing unit determined to perpetuate said annotation information.

4. A software development support apparatus according to claim 3, wherein
said annotation information includes at least information which indicates whether said annotation information is initialized or not, and wherein
said central processing unit initializes annotation information included in said Mbean instance based on said annotation information when said annotation information corresponding to said Mbean instance is stored in said information storage apparatus.

5. A software development support apparatus according to claim 1, wherein
said annotation information is at least one selected from the group consisting of:
information which indicates operation for monitoring elapsed time about execution of an Mbean instance; information which indicates interrupt operation; information which indicates check operation of an argument value; and information which indicates synchronization operation of change information.

6. A software development support apparatus according to claim 1, further comprising:
said central processing unit which generates an object of a web application, wherein
said Mbean instance is an object for inputting predetermined information from said central processing unit.

7. A function extension method which is executed by a computer comprising:
generating an Mbean instance for Java® Management Extensions Application Programming Interface based on an Mbean class for generating said Mbean instance which carries out predetermined processing;
determining whether or not said Mbean class includes annotation information which indicates an attribute of said Mbean class or operation to said Mbean class;
generating an extended-function object which adds to said Mbean class an attribute of said Mbean class or operation to said Mbean class indicated by said annotation information on an occasion of generating said Mbean instance when it is determined that said Mbean class includes said annotation information; and
carrying out said extended-function object corresponding to said Mbean class when said Mbean instance corresponding to said Mbean class is called from a predetermined application and carried out.

8. A function extension method according to claim 7, further comprising:
generating an annotation information object which includes said annotation information and which a terminal connected to said software development support apparatus can refer to on an occasion of generating said Mbean instance when it is determined that said Mbean class includes said annotation information.

9. A function extension method according to claim 8, wherein
said annotation information includes at least information which indicates whether said annotation information is perpetuated or not, wherein
said method further comprising:
storing said annotation information and information indicating said Mbean instance while correlating said annotation information and said information indicating said Mbean instance; and
determining whether to perpetuate said annotation information or not based on said annotation information, and wherein
when it is determined that said annotation information is perpetuated, said annotation information is stored.

10. A function extension method according to claim 9, wherein
said annotation information includes at least information which indicates whether said annotation information is initialized or not, wherein
said method further comprising:
initializing annotation information included in said Mbean instance based on said annotation information when said annotation information corresponding to said Mbean instance is being stored.

11. A non-transitory storage medium storing thereon a program product causing a computer to execute steps of:
generating an Mbean instance for Java® Management Extensions Application Programming Interface based on an Mbean class for generating said Mbean instance which carries out predetermined processing;
determining whether or not said Mbean class includes annotation information which indicates an attribute of said Mbean class or operation to said Mbean class;
generating said extended-function object which adds to said Mbean class an attribute of said Mbean class or operation to said Mbean class indicated by said annotation information on an occasion of generating said Mbean instance when it is determined that said Mbean class includes said annotation information; and
carrying out said extended-function object corresponding to said Mbean class when said Mbean instance corresponding to said Mbean class is called from a predetermined application and carried out.

12. The non-transitory storage medium of claim 11, further comprising steps of:
generating an annotation information object which includes said annotation information and which a terminal connected to said software development support apparatus can refer to on an occasion of generating said Mbean instance when it is determined that said Mbean class includes said annotation information.

13. The non-transitory storage medium of claim 12, wherein
said annotation information includes at least information which indicates whether said annotation information is perpetuated or not, wherein
the storage medium storing thereon said program product causing said computer to execute further steps of:
storing said annotation information and information indicating said Mbean instance while correlating said annotation information and said information indicating said Mbean instance; and
determining whether to perpetuate said annotation information or not based on said annotation information, and wherein when it is determined that said annotation information is perpetuated, said annotation information is stored.

14. The non-transitory storage medium of claim 13, wherein said annotation information includes at least information which indicates whether said annotation information is initialized or not, wherein the storage medium storing thereon said program product causing said computer to execute a further step of:

initializing annotation information included in said Mbean instance based on said annotation information when said annotation information corresponding to said Mbean instance is being stored.

\* \* \* \* \*